(12) United States Patent
Hintermann et al.

(10) Patent No.: US 7,297,819 B2
(45) Date of Patent: Nov. 20, 2007

(54) OPEN-CHAIN ALKOXYAMINES AND THEIR CORRESPONDING NITROXIDES FOR CONTROLLED LOW TEMPERATURE RADICAL POLYMERIZATION

(75) Inventors: Tobias Hintermann, Basel (CH); Peter Nesvadba, Marly (CH); Andreas Kramer, Meyriez (CH); Jochen Fink, Nussloch (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 531 days.

(21) Appl. No.: 10/506,700

(22) PCT Filed: Feb. 25, 2003

(86) PCT No.: PCT/EP03/01895

§ 371 (c)(1),
(2), (4) Date: Sep. 2, 2004

(87) PCT Pub. No.: WO03/074572

PCT Pub. Date: Sep. 12, 2003

(65) Prior Publication Data

US 2005/0124814 A1    Jun. 9, 2005

(30) Foreign Application Priority Data

Mar. 5, 2002    (EP) .................................. 02405168

(51) Int. Cl.
*C07C 239/20*    (2006.01)
*C07D 265/32*    (2006.01)
*C07D 265/34*    (2006.01)
*C08F 4/00*    (2006.01)

(52) U.S. Cl. ........................ 564/301; 564/300; 526/220
(58) Field of Classification Search .................... None
See application file for complete search history.

(56) References Cited

U.S. PATENT DOCUMENTS

| 6,353,107 | B1 | 3/2002 | Kramer et al. ............. 546/216 |
| 6,518,326 | B1 * | 2/2003 | Nesvadba et al. ............ 522/12 |
| 6,624,306 | B2 | 9/2003 | Nesvadba et al. .......... 546/201 |

FOREIGN PATENT DOCUMENTS

| EP | 0135280 | | 3/1985 |
| EP | 0891986 | | 1/1999 |
| EP | WO 00/07981 | * | 2/2000 |
| WO | 98/13392 | | 4/1998 |
| WO | 99/03894 | | 1/1999 |

* cited by examiner

*Primary Examiner*—Yvonne Eyler
*Assistant Examiner*—Yevgeny Valenrod
(74) *Attorney, Agent, or Firm*—Tyler A. Stevenson

(57) ABSTRACT

The present invention relates to open chain alkoxyamine compounds, a polymerizable composition comprising a) at least one ethylenically unsaturated monomer and b) at least one open chain alkoxyamine compound. Further aspects of the present invention are a process for polymerizing ethylenically unsaturated monomers, and the use of open chain alkoxyamine compounds for controlled polymerization. The intermediate N-oxyl derivatives, a composition of the N-oxyl derivatives with ethylenically unsaturated monomers and a free radical initiator X, as well as a process and their use for polymerization are also subjects of the present invention.

15 Claims, No Drawings

OPEN-CHAIN ALKOXYAMINES AND THEIR CORRESPONDING NITROXIDES FOR CONTROLLED LOW TEMPERATURE RADICAL POLYMERIZATION

The present invention relates to open chain alkoxyamine compounds, a polymerizable composition comprising a) at least one ethylenically unsaturated monomer and b) at least one open chain alkoxyamine compound. Further aspects of the present invention are a process for polymerizing ethylenically unsaturated monomers, and the use of open chain alkoxyamine compounds for controlled polymerization. The intermediate N-oxyl derivatives, a composition of the N-oxyl derivatives with ethylenically unsaturated monomers and a free radical initiator X., as well as a process and their use for polymerization are also subjects of the present invention.

The compounds of the present invention provide polymeric resin products having low polydispersity. The polymerization process proceeds with enhanced monomer to polymer conversion efficiency at low temperatures. In particular, this invention relates to stable free radical-mediated polymerization processes which provide homopolymers, random copolymers, block copolymers, multiblock copolymers, graft copolymers and the like, at enhanced rates of polymerization and enhanced monomer to polymer conversions at low temperatures.

The polymerization processes and resin products of the present invention are useful in many applications, including a variety of specialty applications, such as for the preparation of block copolymers which are useful as compatibilizing agents for polymer blends, or dispersing agents for coating systems or for the preparation of narrow molecular weight resins or oligomers for use in coating technologies and thermoplastic films or as toner resins and liquid immersion development ink resins or ink additives used for electrophotographic imaging processes.

There are numerous documents in the literature describing the controlled radical polymerization of ethylenically unsaturated monomers using alkoxyamines or nitroxides.

U.S. Pat. No. 4,581,429 to Solomon et al., issued Apr. 8, 1986, discloses a free radical polymerization process which controls the growth of polymer chains to produce short chain or oligomeric homopolymers and copolymers, including block and graft copolymers. The process employs an initiator having the formula (in part) R'R"N—O—X, where X is a free radical species capable of polymerizing unsaturated monomers. The reactions typically have low conversion rates. Specifically mentioned radical R'R"N—O. groups are derived from 1,1,3,3 tetraethylisoindoline, 1,1,3,3 tetrapropylisoindoline, 2,2,6,6 tetramethylpiperidine, 2,2,5,5 tetramethylpyrrolidine or di-t-butylamine. However, the suggested compounds do not fulfill all requirements. Particularly the polymerization of acrylates does not proceed fast enough and/or the monomer to polymer conversion is not as high as desired.

Recently other attempts to develop new polymerization regulators have been published. WO 98/4408 and WO 98/30601 disclose heterocyclic compounds suitable for controlled polymerization processes. WO 98/13392 discloses open chain alkoxyamines which are derived from NO gas or from nitroso compounds.

WO 00/07981 discloses a variety of open chain alkoxyamine compounds, which have no or at most only one electron withdrawing group at the C-atom in β-position to the nitrogen atom. These compounds are stable at low temperature and decompose readily at elevated temperature.

Surprisingly, it has now been found that higher alkyl and phenyl substitution patterns at the carbon atom in α position to the nitrogen atom lead to initiators/regulators, which allow controlled radical polymerization at a temperature of 100° C. or below. Due to the higher steric hindrance around the nitrogen atom, compared to prior art compounds, high conversions are achievable even at temperatures as low as 100° C. This makes the compounds particularly useful for controlled radical polymerization processes under aqueous conditions at ambient pressure. So far there exists no regulator/initiator which would allow efficient radical polymerization under such conditions, Polymerization of monomers with the instant compounds results in a polymer or copolymer of narrow polydispersity and high monomer to polymer conversion even at temperatures below 100° C. High conversions are achieved even in short reaction times.

One subject of the invention is a compound of formula Ia, Ib, or Ic

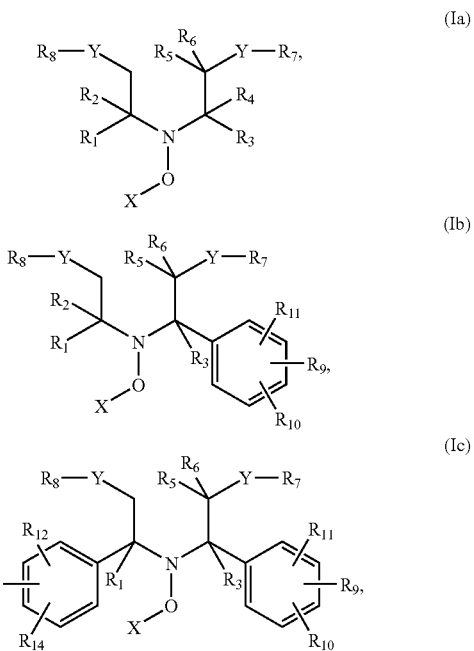

wherein

Y is O or $NR_{101}$ and $R_{101}$ is H or $C_1$-$C_{18}$alkyl or $R_7$ and/or $R_8$ and $R_{101}$ together with the nitrogen atom to which they are bound form a 5 or 6 membered heterocyclic ring;

$R_1$, $R_2$ and $R_3$ independently are benzyl, $C_1$-$C_{18}$alkyl, $C_2$-$C_{18}$alkenyl which are unsubstituted or substituted by OH or a by group —O—C(O)—$R_{102}$; or $C_2$-$C_{18}$alkyl which is interrupted by at least one O atom or a group $NR_{102}$ wherein $R_{102}$ is hydrogen, $C_1$-$C_{18}$alkyl or $C_6$-$C_{10}$aryl;

or $R_1$ and $R_2$ together with the carbon atom to which they are bound form a $C_5$-$C_{12}$cycloalkyl group; or in formula Ia $R_3$ and $R_4$ together with the carbon atom to which they are bound form a $C_5$-$C_{12}$cycloalkyl group;

$R_4$ is $C_2$-$C_{12}$alkyl;

$R_5$ and $R_6$ are independently H, $C_1$-$C_{18}$alkyl, $C_2$-$C_{18}$alkenyl, benzyl, $C_5$-$C_{12}$cycloalkyl or phenyl;

$R_7$ and $R_8$ independently are H, $C_1$-$C_{18}$alkyl, $C_2$-$C_{18}$alkenyl, $C_5$-$C_{12}$cycloalkyl or a group —C(O)—($C_1$-$C_{18}$)alkyl, —C(O)—O—($C_1$-$C_{18}$)alkyl, —C(O)—O-phenyl, —C(O)—C(O)—OH, —C(O)—C(O)—NH—(C$_1$-C$_{18}$alkyl), —C(S)—S—(C$_1$-C$_{18}$)alkyl,

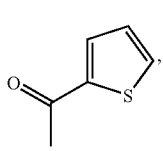

—SiR$_a$R$_b$R$_c$ wherein R$_a$, R$_b$, R$_c$ independently are C$_1$-C$_{18}$alkyl or R$_7$ and R$_5$ are the following group

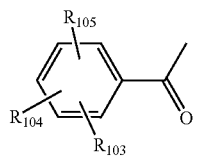

wherein R$_{103}$, R$_{104}$ and R$_{105}$ independently are H, C$_1$-C$_8$alkyl, C$_1$-C$_8$alkoxy, C$_1$-C$_8$alkylthio, —O—C(O)—(C$_1$-C$_8$)alkyl, —O—C(O)—(C$_6$-C$_{10}$)aryl, nitro, cyano or halogen; R$_9$, R$_{10}$, R$_{11}$, R$_{12}$, R$_{13}$ and R$_{14}$ independently are H, OH, C$_1$-C$_8$alkoxy, C$_1$-C$_8$ alkyl, SH, C$_1$-C$_8$alkylthio, —O—C(O)—(C$_1$-C$_8$)alkyl, —O—C(O)—(C$_6$-C$_{10}$)aryl, nitro, cyano, halogen or a group NR$_{106}$R$_{107}$ wherein R$_{106}$ and R$_{107}$ independently are hydrogen, C$_1$-C$_{18}$alkyl or C$_6$-C$_{10}$aryl or together with the nitrogen atom to which they are bound form a 5 or 6 membered heterocyclic ring; and X is selected from the group consisting of —CH$_2$-aryl,

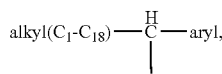

—CH$_2$—CH$_2$-aryl,

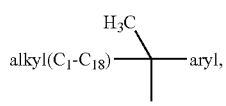

(C$_5$-C$_6$cycloalkyl)$_2$CCN, (C$_1$-C$_{12}$alkyl)$_2$CCN, —CH$_2$CH=CH$_2$, (C$_1$-C$_{12}$)alkyl-CR$_{20}$—C(O)—(C$_1$-C$_{12}$)alkyl, (C$_1$-C$_{12}$)alkyl-CR$_{20}$—C(O)—(C$_6$-C$_{10}$)aryl, (C$_1$-C$_{12}$)alkyl-CR$_{20}$—C(O)—O—R$_{21}$, (C$_1$-C$_{12}$)alkyl-CR$_{20}$—C(O)-phenoxy, (C$_1$-C$_{12}$)alkyl-CR$_{20}$—C(O)—N-di(C$_1$-C$_{12}$)alkyl, (C$_1$-C$_{12}$)alkyl-CR$_{20}$—CO—NH(C$_1$-C$_{12}$)alkyl, (C$_1$-C$_{12}$)alkyl-CR$_{20}$—CO—NH$_2$, —CH$_2$CH=CH—CH$_3$, —CH$_2$—C(CH$_3$)=CH$_2$, —CH$_2$—CH=CH-phenyl,

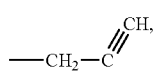

3-cyclohexenyl, 3-cyclopentenyl,

wherein
R$_{20}$ is hydrogen or C$_1$-C$_{12}$alkyl;
R$_{21}$ is C$_1$-C$_{18}$alkyl or C$_2$-C$_{18}$alkyl which is interrupted by at least one O atom or a group NR$_{102}$ wherein R$_{102}$ is hydrogen, C$_1$-C$_{18}$alkyl or C$_6$-C$_{10}$aryl;
the alkyl groups are unsubstituted or substituted with one or more —OH, —COOH, —O(C$_1$-C$_8$alkyl), NR$_{106}$R$_{107}$ or —COR$_{20}$ groups wherein R$_{20}$, R$_{106}$ and R$_{107}$ have the meanings as defined above; the aryl groups are phenyl or naphthyl which are unsubstituted or substituted with C$_1$-C$_{12}$alkyl, halogen, C$_1$-C$_{12}$alkoxy, C$_1$-C$_{12}$alkylthio, C$_1$-C$_{12}$alkylcarbonyl, glycidyloxy, OH, SH, —COOH or —COO(C$_1$-C$_{12}$)alkyl.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 2 to 18 carbon atoms is a linear or branched radical as for example vinyl, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl oder n-4-octadecenyl.

Preferred is alkenyl with 3 bis 12, particularly preferred with 3 to 6 carbon atoms.

5 or 6 membered heterocyclic rings are for example piperidine or pyrolidine.

Examples for hydroxy substituted alkyl are hydroxy propyl, hydroxy butyl or hydroxy hexyl.

C$_2$-C$_{18}$alkyl interrupted by at least one O atom is for example —CH$_2$—CH$_2$—O—CH$_2$—CH$_3$, —CH$_2$—CH$_2$—O—CH$_3$— or —CH$_2$—CH$_2$—O—CH$_2$—CH$_2$—O—CH$_2$—CH$_3$—. It is preferably derived from polyethylene glycol. A general description is —((CH$_2$)$_a$—O)$_b$—H/CH$_3$, wherein a is a number from 1 to 6 and b is a number from 2 to 10.

C$_2$-C$_{18}$alkyl interrupted by at least one NR$_5$ group may be generally described as —((CH$_2$)$_a$—NR$_5$)$_b$—H/CH$_3$, wherein a, b and R$_5$ are as defined above.

C$_6$-C$_{10}$ aryl is for example phenyl or naphthyl, but also comprised are C$_1$-C$_4$alkyl substituted phenyl, C$_1$-C$_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

C$_5$-C$_{12}$cycloalkyl is typically cyclopentyl, methylcyclopentyl, dimethylcyclopentyl, cyclohexyl, methylcyclohexyl or trimethylcyclohexyl.

Alkoxy substituents are typically methoxy, ethoxy, propoxy or butoxy and their corresponding isomers.

The alkythio substituents may be derived from the corresponding alkoxy substituents already mentioned.

Halogen is fluoro, chloro, bromo or iodo.

Preferably X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

—CH$_2$CH=CH$_2$, CH$_3$CH—CH=CH$_2$, (C$_1$-C$_8$alkyl)CR$_{20}$—C(O)-phenyl, (C$_1$-C$_8$)alkyl-CR$_{20}$—C(O)—(C$_1$-C$_8$)alkoxy, (C$_1$-C$_8$)alkyl-CR$_{20}$—C(O)—(C$_1$-C$_8$)alkyl, (C$_1$-C$_8$)alkyl-CR$_{20}$—C(O)—N-di(C$_1$-C$_8$)alkyl, (C$_1$-C$_8$)alkyl-CR$_{20}$—C(O)—NH(C$_1$-C$_8$)alkyl and (C$_1$-C$_8$)alkyl-CR$_{20}$—C(O)—NH$_2$, wherein
R$_{20}$ is hydrogen or (C$_1$-C$_8$)alkyl.

More preferably X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

—CH$_2$CH=CH$_2$, CH$_3$CH—CH=CH$_2$, (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$) alkyl, (C$_1$-C$_4$)alkyl-CR$_{20}$—C(O)—NH(C$_1$-C$_4$)alkyl and (C$_1$-C$_4$)alkyl-CR$_{20}$—C(O)—NH$_2$, wherein
R$_{20}$ is hydrogen or (C$_1$-C$_4$)alkyl.

Preferably in the compounds of formula Ia, Ib and Ic Y is O and in formula Ia R$_4$ is C$_2$-C$_6$alkyl or R$_3$ and R$_4$ together with the carbon atom to which they are bound form a 5 to 7 membered cycloalkyl ring.

A preferred subgenus of compounds is wherein
R$_1$, R$_2$ and R$_3$ are C$_1$-C$_5$alkyl; or in formula Ia R$_3$ and R$_4$ together with the carbon atom to which they are bound form a C$_5$-C$_6$cycloalkyl group; or
R$_4$ is C$_2$-C$_6$alkyl;
R$_5$ and R$_6$ are H;
R$_7$ and R$_8$ independently are H, C$_1$-C$_{18}$alkyl, allyl, benzyl, C$_5$-C$_{12}$cycloalkyl or a group —C(O)—(C$_1$-C$_{18}$)alkyl, —C(O)—O—(C$_1$-C$_{18}$)alkyl, —C(O)—C(O)—OH, —C(S)—S—(C$_1$-C$_{18}$)alkyl,

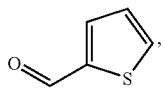

—SiR$_a$R$_b$R$_c$ wherein R$_a$, R$_b$, R$_c$ independently are C$_1$-C$_{18}$alkyl or R$_7$ and R$_8$ are the following group

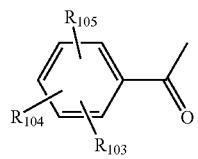

wherein R$_{103}$, R$_{104}$ and R$_{105}$ independently are H, C$_1$-C$_8$alkoxy, C$_1$-C$_8$alkylthio, —O—C(O)—(C$_1$-C$_8$)alkyl, nitro, cyano, halogen, C$_1$-C$_8$alkyl;
R$_9$, R$_{10}$ and R$_{11}$ independently are H, C$_1$-C$_8$alkoxy, C$_1$-C$_8$alkylthio, —O—C(O)—(C$_1$-C$_8$)alkyl, nitro, cyano, halogen or C$_1$-C$_8$alkyl; and
X is as defined above.

More preferred is a compound of formula Ib or Ic.

A particularly preferred subgenus is a compound of formula Ib wherein
Y is O;
R$_1$ and R$_2$ are C$_1$-C$_5$alkyl, or together with the carbon atom to which they are bound form a C$_5$-C$_7$cycloalkyl group;
R$_3$ is methyl, ethyl or propyl;
R$_5$ and R$_6$ are H;
R$_7$ and R$_8$ independently are H, C$_1$-C$_{18}$alkyl, allyl, benzyl, C$_5$-C$_{12}$cycloalkyl or a group —C(O)—(C$_1$-C$_{18}$)alkyl, —C(O)—O—(C$_1$-C$_{18}$)alkyl, —C(O)—C(O)—OH, —C(S)—S—(C$_1$-C$_{18}$)alkyl,

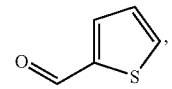

—SiR$_a$R$_b$R$_c$ wherein R$_a$, R$_b$, R$_c$ independently are C$_1$-C$_{18}$alkyl or R$_7$ and R$_8$ are the following group

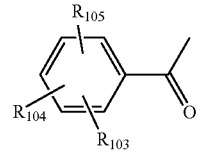

wherein R$_{103}$, R$_{104}$ and R$_{105}$ independently are H, C$_1$-C$_8$alkoxy, C$_1$-C$_8$alkylthio, —O—C(O)—(C$_1$-C$_8$)alkyl, nitro, cyano, halogen, C$_1$-C$_8$alkyl;
R$_9$, R$_{10}$ and R$_{11}$ independently are H, C$_1$-C$_8$alkoxy, C$_1$-C$_8$alkylthio, —O—C(O)—(C$_1$-C$_8$)alkyl, nitro, cyano, halogen or C$_1$-C$_8$alkyl; and
X is selected from the group consisting of
—CH$_2$ aryl,

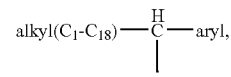

—CH$_2$—CH$_2$-aryl,

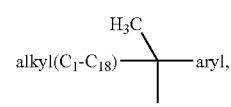

(C$_5$-C$_6$cycloalkyl)$_2$CCN, (C$_1$-C$_{12}$alkyl)$_2$CCN, —CH$_2$CH=CH$_2$, (C$_1$-C$_{12}$)alkyl-CR$_{20}$—C(O)—(C$_1$-C$_{12}$)alkyl, (C$_1$-C$_{12}$)alkyl-CR$_{20}$—C(O)—(C$_6$-C$_{10}$)aryl, (C$_1$-C$_{12}$)alkyl-CR$_{20}$—C(O)—O—R$_{21}$, (C$_1$-C$_{12}$)alkyl-CR$_{20}$—C(O)-phenoxy, (C$_1$-C$_{12}$)alkyl-CR$_{20}$—C(O)—N-di(C$_1$-C$_{12}$)alkyl, (C$_1$-C$_{12}$)alkyl-CR$_{20}$—CO—NH(C$_1$-C$_{12}$)alkyl, (C$_1$-C$_{12}$)

alkyl-CR$_{20}$—CO—NH$_2$, —CH$_2$CH=CH—CH$_3$, —CH$_2$—C(CH$_3$)=CH$_2$, —CH$_2$—CH=CH-phenyl,

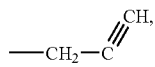

3-cyclohexenyl, 3-cyclopentenyl,

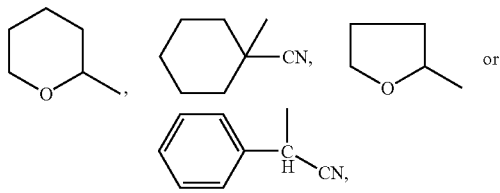

wherein
R$_{20}$ is hydrogen or C$_1$-C$_{12}$alkyl;
R$_{21}$ is C$_1$-C$_{18}$alkyl or C$_2$-C$_{18}$alkyl which is interrupted by at least one O atom or a group NR$_{102}$ wherein R$_{102}$ is hydrogen, C$_1$-C$_{18}$alkyl or C$_6$-C$_{10}$aryl;
the alkyl groups are unsubstituted or substituted with one or more —OH, —COOH, —O(C$_1$-C$_8$alkyl), NR$_{106}$R$_{107}$ or —COR$_{20}$ groups wherein R$_{20}$, R$_{106}$ and R$_{107}$ have the meanings as defined above;
the aryl groups are phenyl or naphthyl which are unsubstituted or substituted with C$_1$-C$_{12}$alkyl, halogen, C$_1$-C$_{12}$alkoxy, C$_1$-C$_{12}$alkylcarbonyl, glycidyloxy, OH, —COOH or —COO(C$_1$-C$_{12}$)alkyl.

A further subject of the invention is a polymerizable composition, comprising
a) at least one ethylenically unsaturated monomer or oligomer, and
b) a compound according to formula (Ia) (Ib) or (Ic).

Yet another subject of the invention is a process for preparing an oligomer, a cooligomer, a polymer or a copolymer (block or random) by free radical polymerization of at least one ethylenically unsaturated monomer or oligomer, which comprises (co)polymerizing the monomer or monomers/oligomers in the presence of an initiator compound of formula (Ia), (Ib) or (Ic) under reaction conditions capable of effecting scission of the O—X bond to form two free radicals, the radical •X being capable of initiating polymerization.

Preferably the scission of the O—X bond is effected by ultrasonic treatment, heating or exposure to electromagnetic radiation, ranging from γ to microwaves.

More preferably the scission of the O—X bond is effected by heating and takes place at a temperature of between 50° C. and 160° C., in particular between 60° C. and 120° C. and most preferred between 80° C. and 100° C.

Preferably the compound of formula Ia, Ib or Ic is present in an amount of from 0.001 mol-% to 20 mol-%, more preferably of from 0.002 mol-% to 10 mol-% and most preferably of from 0.005 mol-% to 5 mol-% based on the monomer or monomer mixture.

When monomer mixtures are used the average molecular weight is taken as basis.

Definitions and preferences for the compounds are mentioned above, they apply also for the composition and process.

Preferably the ethylenically unsaturated monomer is selected from the group consisting of ethylene, propylene, n-butylene, i-butylene, styrene, substituted styrene, conjugated dienes, acrolein, vinyl acetate, vinylpyrrolidone, vinylimidazole, maleic anhydride, (alkyl)acrylic acidanhydrides, (alkyl)acrylic acid salts, (alkyl)acrylic esters, (alkyl)acrylonitriles, (alkyl)acrylamides, vinyl halides or vinylidene halides.

Preferably the ethylenically unsaturated monomer is a compound of formula CH$_2$=C(R$_a$)—(C=Z)-R$_b$, wherein R$_a$ is hydrogen or C$_1$-C$_4$alkyl, R$_b$ is NH$_2$, O$^-$(Me$^+$), glycidyl, unsubstituted C$_1$-C$_{16}$alkoxy, C$_2$-C$_{100}$alkoxy interrupted by at least one N and/or O atom, or hydroxy-substituted C$_1$-C$_{18}$alkoxy, unsubstituted C$_1$-C$_{18}$alkylamino, di(C$_1$-C$_{18}$alkyl)amino, hydroxy-substituted C$_1$-C$_{18}$alkylamino or hydroxy-substituted di(C$_1$-C$_{18}$alkyl)amino, —O—CH$_2$—CH$_2$—N(CH$_3$)$_2$ or —O—CH$_2$—CH$_2$—N$^+$H(CH$_3$)$_2$An$^-$;
An$^-$ is a anion of a monovalent organic or inorganic acid;
Me is a monovalent metal atom or the ammonium ion.
Z is oxygen or sulfur.

Examples of acids from which the anion An$^-$ is derived are C$_1$-C$_{12}$carboxylic acids, organic sulfonic acids such as CF$_3$SO$_3$H or CH$_3$SO$_3$H, mineralic acids such as HCl, HBr or HI, oxo acids such as HClO$_4$ or complex acids such as HPF$_6$ or HBF$_4$.

Examples for R$_a$ as C$_2$-C$_{100}$alkoxy interrupted by at least one O atom are of formula

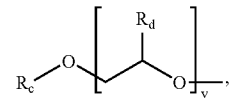

wherein R$_c$ is C$_1$-C$_{25}$alkyl, phenyl or phenyl substituted by C$_1$-C$_{18}$alkyl, R$_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

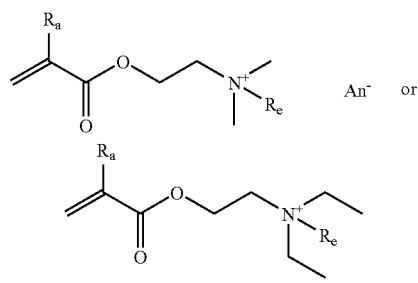

An$^-$, wherein An$^-$ and R$_a$ have the meaning as defined above and R$_8$ is methyl or benzyl. An$^-$ is preferably Cl$^-$, Br$^-$or $^-$O$_3$S—CH$_3$.

Further acrylate monomers are

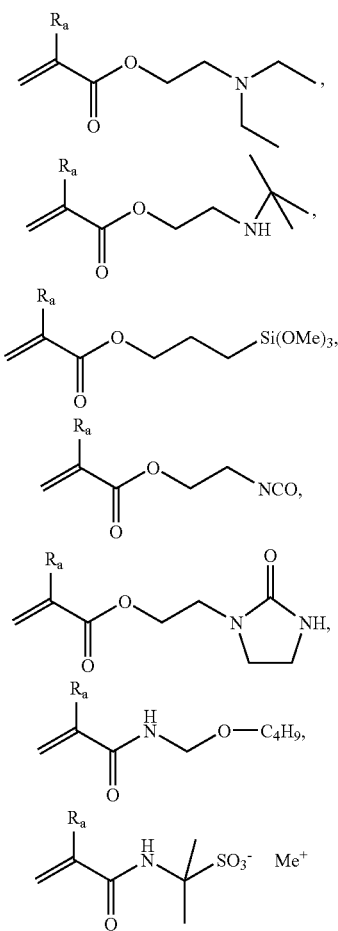

Examples for suitable monomers other than acrylates are

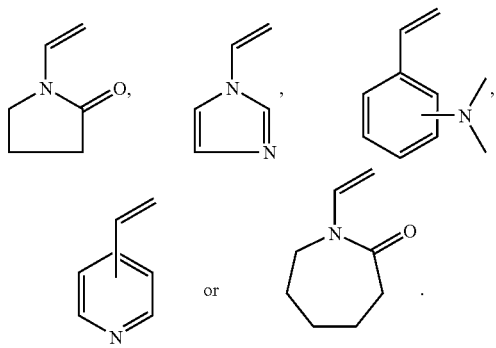

Preferably $R_a$ is hydrogen or methyl, $R_b$ is $NH_2$, gycidyl, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and Z is oxygen.

More preferred the ethylenically unsaturated monomer is an acrylic acid ester, acrylamide, acrylnitrile, methacrylic acid ester, methacrylamide, methacrylnitrile.

Acrylic acid esters and methacrylic acid esters are typically $C_1$-$C_{18}$alkyl esters.

Most preferred is n-butylacrylate, tert-butylacrylate, methylacrylate, ethylacrylate, propylacrylate, hexylacrylate and hydroxyethylacrylate.

After the polymerization step is completed the reaction mixture may be cooled down to a temperature below 60° C., preferably to room temperature. The polymer may be stored at this temperature without further reactions occurring.

The process may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

When acrylic or methacrylic monomers are polymerized, the process is preferably carried out in the presence of an organic solvent. The concentration of the monomer in the organic solvent may influence polymerization rate and final conversion. The concentration may, for example, vary from 5% to 80% by weight, based on the solvent. It is not necessary that the whole amount of monomer is present at the beginning of the polymerization. It is also possible to add further monomer after the polymerization reaction has already started.

As already mentioned the present compounds are particularly useful for aqueous polymerizations, since they allow efficient conversions at temperatures at or below 100° C.

If organic solvents are used, suitable solvents or mixtures of solvents are typically pure alkanes (hexane, heptane, octane, isooctane), aromatic hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

The process is particularly useful for the preparation of block copolymers.

Block copolymers are, for example, block copolymers of polystyrene and polyacrylate (e.g., poly(styrene-co-acrylate) or poly(styrene-co-acrylate-co-styrene). They are useful as adhesives or as compatibilizers for polymer blends or as polymer toughening agents. Poly(methylmethacrylate-co-acrylate) diblock copolymers or poly(methylacrylate-co-acrylate-co-methacrylate) triblock copolymers) are useful as dispersing agents for coating systeme, as coating additives (e.g. rheological agents, compatibilizers, reactive diluents) or as resin component in coatings (e.g. high solid paints). Block copolymers of styrene, (meth)acrylates and/or acrylonitrile are useful as modifiers for plastics, elastomers and adhesives.

Furthermore, block copolymers of this invention, wherein the blocks alternate between polar monomers and non-polar monomers, are useful in many applications as amphiphilic surfactants or dispersants for preparing highly uniform polymer blends.

The (co)polymers of the present invention may have a number average molecular weight from 1 000 to 400 000 g/mol, preferably from 2 000 to 250 000 g/mol and, more preferably, from 2 000 to 200 000 g/mol. The number average molecular weight may be determined by size exclusion chromatography (SEC), matrix assisted laser desorption/ionization mass spectrometry (MALDI-MS) or, if the initiator carries a group which can be easily distinguished from the monomer(s), by NMR spectroscopy or other conventional methods.

The polymers or copolymers of the present invention have preferably a polydispersity of from 1.1 to 2, more preferably of from 1.1 to 1.8 and most preferably from 1.1 to 1.6.

Thus, the present invention also encompasses in the synthesis novel block, multi-block, star, gradient, random, hyperbranched and dendritic copolymers, as well as graft copolymers.

The polymers prepared by the present invention are useful for following applications: adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink materials, imaging materials, superabsorbants, cosmetics, hair products, preservatives, biocide materials or modifiers for asphalt, leather, textiles, ceramics and wood.

Alternatively controlled free radical polymerization may be carried out using the nitroxyl precursors of the corresponding alkoxyamines together with a source of free radicals. Consequently a further subject of the invention is a polymerizable composition, comprising a) at least one ethylenically unsaturated monomer or oligomer, and b) a compound according to formula (IIa) (IIb) or (IIc)

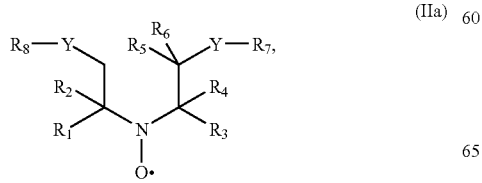

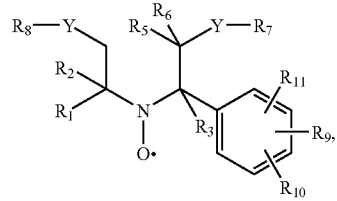

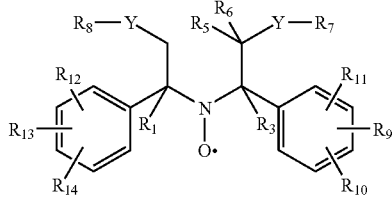

wherein

Y is O or $NR_{101}$ and $R_{101}$ is H or $C_1$-$C_{18}$alkyl or $R_7$ and/or $R_8$ and $R_{101}$, together with the nitrogen atom to which they are bound form a 5 or 6 membered heterocyclic ring;

$R_1$, $R_2$ and $R_3$ independently are benzyl, $C_1$-$C_{18}$alkyl, $C_2$-$C_{18}$alkenyl which are unsubstituted or substituted by OH or a by group —O—C(O)—$R_{102}$; or $C_2$-$C_{18}$alkyl which is interrupted by at least one O atom or a group $NR_{102}$ wherein $R_{102}$ is hydrogen, $C_1$-$C_{18}$alkyl or $C_6$-$C_{10}$aryl; or $R_1$ and $R_2$ together with the carbon atom to which they are bound form a $C_5$-$C_{12}$cycloalkyl group; or in formula Ia $R_3$ and $R_4$ together with the carbon atom to which they are bound form a $C_5$-$C_{12}$cycloalkyl group;

$R_4$ is $C_2$-$C_{12}$alkyl;

$R_5$ and $R_6$ are independently H, $C_1$-$C_{18}$alkyl, $C_2$-$C_{18}$alkenyl, benzyl, $C_5$-$C_{12}$cycloalkyl or phenyl;

$R_7$ and $R_8$ independently are H, $C_1$-$C_{18}$alkyl, $C_2$-$C_{18}$alkenyl, $C_5$-$C_{12}$cycloalkyl or a group —C(O)—($C_1$-$C_{18}$)alkyl, —C(O)—O—($C_1$-$C_{18}$)alkyl, —C(O)—O-phenyl, —C(O)—C(O)—OH, —C(O) —C(O)—NH—($C_1$-$C_{18}$alkyl), —C(S)—S—($C_1$-$C_{18}$)alkyl,

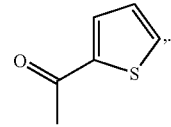

—$SiR_aR_bR_c$ wherein $R_a$, $R_b$, $R_c$ independently are $C_1$-$C_{18}$alkyl or $R_7$ and $R_8$ are the following group

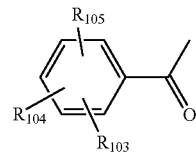

wherein $R_{103}$, $R_{104}$ and $R_{105}$ independently are H, $C_1$-$C_8$alkyl, $C_1$-$C_8$alkoxy, $C_1$-$C_8$alkylthio, —O—C(O)—($C_1$-$C_8$)alkyl, —O—C(O)—($C_6$-$C_{10}$)aryl, nitro, cyano or halogen;

$R_9$, $R_{10}$, $R_{11}$, $R_{12}$, $R_{13}$ and $R_{14}$ independently are H, OH, $C_1$-$C_8$alkoxy, $C_1$-$C_8$alkyl, SH, $C_1$-$C_8$alkylthio, —O—C(O)—($C_1$-$C_8$)alkyl, —O—C(O)—($C_6$-$C_{10}$)aryl, nitro, cyano, halogen or a group $NR_{106}R_{107}$ wherein $R_{106}$ and $R_{107}$ independently are hydrogen, $C_1$-$C_{18}$alkyl or $C_6$-$C_{10}$aryl or together with the nitrogen atom to which they are bound form a 5 or 6 membered heterocyclic ring; and c) a source of free radicals capable of initiating polymerization of ethylenically unsaturated monomers.

Also subject of the invention is a process for preparing an oligomer, a cooligomer, a polymer or a copolymer (block or random) by free radical polymerization of at least one ethylenically unsaturated monomer/oligomer, which comprises subjecting the above composition to heat or actinic radiation.

For example the polymerization is carried out by applying heat and takes place at a temperature of between 50° C. and 160° C., in particular between 60° C. and 120° C. and most preferred between 80° C. and 100° C.

The free radical initiator of component c) is preferably a bis-azo compound, a peroxide perester or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α, α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

Azo initiators and peroxides are most preferred.

Preferably the nitroxyl radical, component b), is present in an amount of from 0.001 mol-% to 20 mol-%, more preferably of from 0.002 mol-% to 10 mol-% and most preferably of from 0.005 mol-% to 5 mol-% based on the monomer or monomer mixture.

Preferably the free radical initiator, component c), is present in an amount of from 0.001 mol-% to 20 mol-%, more preferably of from 0.002 mol-% to 10 mol-% and most preferably of from 0.005 mol-% to 5 mol-%, based on the monomer or monomer mixture.

The molar ratio of free radical initiator to stable free nitroxyl radical is preferably from 20:1 to 1:2, more preferably from 10:1 to 1:2.

The compounds of formula IIb are novel and therefore also subject of the present invention

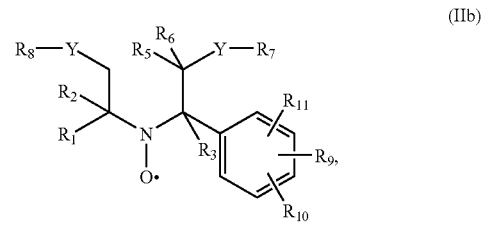

(IIb)

wherein

Y is O or $NR_{101}$ and $R_{101}$ is H or $C_1$-$C_{18}$alkyl or $R_7$ and $R_{110}$ together with the nitrogen atom to which they are bound form a 5 or 6 membered heterocyclic ring;

$R_1$, $R_2$ and $R_3$ independently are benzyl, $C_1$-$C_{18}$alkyl, $C_2$-$C_{18}$alkenyl which are unsubstituted or substituted by OH or a group —O—C(O)—$R_{102}$; or $C_2$-$C_{18}$alkyl which is interrupted by at least one O atom or a group $NR_{102}$ wherein $R_{102}$ is hydrogen, $C_1$-$C_{18}$alkyl or $C_6$-$C_{10}$aryl;

or $R_1$ and $R_2$ together with the carbon atom to which they are bound form a $C_5$-$C_{12}$cycloalkyl group;

$R_5$ and $R_6$ are independently H, $C_2$-$C_{18}$alkyl, $C_2$-$C_{18}$alkenyl, benzyl, $C_5$-$C_{12}$cycloalkyl or phenyl;

$R_7$ and $R_8$ independently are H, $C_1$-$C_{18}$alkyl, $C_2$-$C_{18}$alkenyl, $C_5$-$C_{12}$cycloalkyl or a group —C(O)—($C_1$-$C_{18}$)alkyl, —C(O)—O—($C_1$-$C_{18}$)alkyl, —C(O)—O-phenyl, —C(O)—C(O)—OH, —C(O) —C(O)—NH—($C_1$-$C_{15}$alkyl), —C(S)—S—($C_1$-$C_{18}$)alkyl,

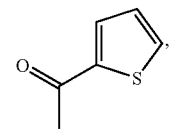

—$SiR_aR_bR_c$ wherein $R_a$, $R_b$, $R_c$ independently are $C_1$-$C_{18}$alkyl or $R_7$ and $R_8$ are one of the following groups

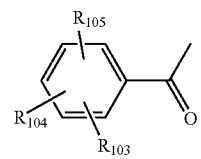

wherein $R_{103}$, $R_{104}$ and $R_{105}$ independently are H, $C_1$-$C_8$alkyl, $C_1$-$C_8$alkoxy, $C_1$-$C_8$alkylthio, —O—C(O)—($C_1$-$C_8$)alkyl, —O—C(O)—($C_6$-$C_{10}$)aryl, nitro, cyano or halogen;

$R_9$, $R_{10}$ and $R_{11}$ independently are H, OH, $C_1$-$C_8$alkoxy, $C_1$-$C_8$alkyl, SH, $C_1$-$C_8$alkylthio, —O—C(O)—($C_1$-$C_8$) alkyl, —O—C(O)—($C_6$-$C_{10}$)aryl, nitro, cyano, halogen or a group $NR_{106}R_{107}$ wherein $R_{106}$ and $R_{107}$ independently are hydrogen, $C_1$-$C_{18}$alkyl or $C_6$-$C_{10}$aryl or together with the nitrogen atom to which they are bound form a 5 or 6 membered heterocyclic ring.

Preferred is a compound of formula IIb wherein
Y is O;
$R_1$ and $R_2$ are —$CH_3$, or together with the carbon atom to which they are bound form a $C_5$-$C_7$cycloalkyl group;
$R_3$ is methyl, ethyl or propyl;
$R_5$ and $R_6$ are H;
$R_7$ and $R_8$ independently are H, $C_1$-$C_{18}$alkyl, allyl, benzyl, $C_5$-$C_{12}$cycloalkyl or a group —C(O)—($C_1$-$C_{18}$)alkyl, —C(O)—O—($C_1$-$C_{18}$)alkyl, —C(O)—C(O)—OH, —C(S)—S—($C_1$-$C_{18}$)alkyl,

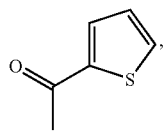

—$SiR_aR_bR_c$ wherein $R_a$, $R_b$, $R_c$ independently are $C_1$-$C_{18}$alkyl or $R_7$ and $R_8$ are one of the following groups

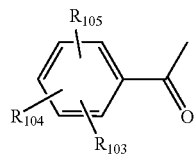

wherein $R_{103}$, $R_{104}$ and $R_{105}$ independently are H, $C_1$-$C_8$alkoxy, $C_1$-$C_8$alkylthio, —O—C(O)—($C_1$-$C_8$)alkyl, nitro, cyano, halogen, $C_1$-$C_8$alkyl; and
$R_9$, $R_{10}$ and $R_{11}$ independently are H, $C_1$-$C_8$alkoxy, $C_1$-$C_8$alkylthio, —O—C(O)—($C_1$-$C_8$)alkyl, nitro, cyano, halogen or $C_1$-$C_8$alkyl.

Further subjects of the invention are the use of a compound of formula Ia, Ib, or Ic for the polymerization of ethylenically unsaturated monomers; the use of a compound of formula IIa, IIb or IIc together with a source of free radicals for the polymerization of ethylenically unsaturated monomers and a polymer or copolymer obtainable by one of the above mentioned polymerization processes.

The definitions and preferences given for the alkoxyamine compounds apply also for the nitroxyl compounds, their composition with ethylenically unsaturated monomers and the polymerization process therewith.

Open chain alkoxyamines and nitroxides are prepared via two general routes.
A) Oxidation of 3,3,5,5-tetrasubstituted morpholin-2-ones by peracetic acid, followed by alkylation of the resulting N-oxyls (CuBr, t-BuOOH, ethylbenzene; or CuCl, pentamethylethylenetriamine, 1-phenethylbromide) and reductive ring cleavage (LiAlH$_4$).
B) Ring opening of 3,3,5,5-tetrasubstituted morpholin-2-ones (NaOH), followed by dialkylation of the resulting hydroxy carboxylate salts (NaH, alkylhalide), reduction of the ester group (LiAlH$_4$), acetylation (acetylchloride, pyridine), oxidation to the N-oxyl (peracetic acid) and alkylation of the N-oxyl (CuCl, pentamethylethylenetriamine, 1-phenethylbromide). 3,3,5,5-Tetrasubstituted morpholin-2-ones and 3,3,5,5-tetrasubstituted morpholin-2-one N-oxyls are well known compounds in the literature. Their preparation is described e.g. in WO 98/44008, WO 01/23435, J. T. Lai, Synthesis 1984, 122 and S. D. Rychnovsky et al., J. Org. Chem. 1998, 63, 6363.

The following examples illustrate the invention.

A) EXAMPLES FOR THE PREPARATION OF ALKOXYAMINES

The alkoxyamines may for example be prepared from morpholinone alkoxyamines as described above. The prepared morpholinone-alkoxyamine precursors are shown in Table 1

TABLE 1

| | Morpholinone-alkoxyamines |
|---|---|
| No | Structure |
| 101 | <br>Reference compound as example for the general preparation |
| 102 | |
| 103 | |

TABLE 1-continued

Morpholinone-alkoxyamines

| No | Structure |
|---|---|
| 104 | (structure) |
| 105 | (structure) |
| 106 | (structure) |
| 107 | (structure) |
| 108 | (structure) |
| 109 | (structure) |

Example A1

Reference for the General Preparation: 3,3,5,5-Tetramethyl-4-(1-phenyl-ethoxy)-morpholin-2-one 101

To a solution of 87.8 g (0.51 mol) 3,3,5,5-tetramethyl-morpholin-2-one-N-oxyl (prepared according to J. T. Lai, Synthesis 1984, 122) in ethylbenzene (1275 ml) and water (64 ml) is added 0.88 g (6.1 mmol) of CuBr and 1.97 g (6.1 mmol) of tetrabutylammoniumbromide at ambient temperature. The red suspension is vigorously stirred and heated to 40° C. At this temperature 150.7 ml (1.10 mol) of a 70% aqueous tert-butylhydroperoxyde solution is added over a period of 20 min. The internal temperature rises during the addition and is kept below 65° C. by cooling with a water-bath. After complete addition, the emulsion is stirred at 50° C. for 30 min, then cooled in an ice-bath and a solution of 137 g $Na_2SO_3$ in water (1000 ml) is added. The phases are separated, the organic layer is washed with water (2×500 ml) and brine (250 ml), dried over $Na_2SO_4$, filtered and concentrated under reduced pressure. The residue is recrystallized from hexane to yield 104.8 g (74%) of the title compound as a white solid.

$^1$H-NMR (400 MHz, $CDCl_3$), δ (ppm): 7.37-7.28 m (5H), 4.76-4.64 2q (1H), 4.09 -3.87 m (2H), 1.65, 1.62, 1.35, 1.29, 1.22, 1.06, 0.85, 0.69 8s (12H), 1.48, 1.44 2d (3H).

Example A2

3,3-Diethyl-5,5-dimethyl-4-(1-phenyl-ethoxy)-morpholin-2-one 102

The compound is prepared in analogy to example A1 from 3,3-diethyl-5,5-dimethyl-morpholin-2-one-N-oxyl in a yield of 100% (crude) as yellow liquid.

$^1$H-NMR (400 MHz, $CDCl_3$), δ(ppm): 7.36-7.25 m (5H), 4.73-4.65 m (1H), 4.04 -3.77 m (2H), 2.22-1.68 m (3H), 1.50-1.46 m (3H), 1.40-0.67 m (13H).

Example A3

5,5-Dimethyl-4-(1-phenyl-ethoxy)-3,3dipropyl-morpholin-2-one 103

The compound is prepared in analogy to example A1 from 5,5-dimethyl-3,3-dipropyl-morpholin-2-one-N-oxyl in a yield of 100% (crude) as slightly yellow liquid.

¹H-NMR (400 MHz, CDCl₃), δ(ppm): 7.36-7.26 (5H), 4.73-4.64 m (1H), 4.02 -3.76 m (2H), 2.12-1.36 m (7H), 1.29-0.60 m (16H).

Example A4

3,5,5-Trimethyl-3-pentyl-4-(1-phenyl-ethoxy)-morpholin-2-one 104

The compound is prepared in analogy to example A1 from 3,5,5-trimethyl-3-pentyl-morpholin-2-one-N-oxyl in a yield of 100% (crude) as yellow liquid.

¹H-NMR (400 MHz, CDCl₃), δ(ppm): 7.34-7.25 m (5H), 4.73-4.62 m (1H), 4.03, 3.92, 3.82, 3.70 4d (2H), 1.89-0.61 m (21H).

Example A5

2,2-Dimethyl-1-(1-phenyl-ethoxy)-4-oxa-1-aza-spiro[5.5]undecan-5-one 105

The compound is prepared in analogy to example A1 from 2,2-Dimethyl-4-oxa-1-aza-spiro[5.5]undecan-5-one-N-oxyl in a yield of 81% after crystallization as white solid.
M.p.: 98-102° C.

Example A6

2,2-Dimethyl-1-(1-phenyl-ethoxy)-4-oxa-1-aza-spiro[5.6]dodecan-5-one

The compound is prepared in analogy to example A1 from 2,2-Dimethyl-4-oxa-1-aza-spiro[5.6]dodecan-5-one-N-oxyl in a yield of 89% after crystallization as white solid.
M.p.: 88-90° C.

Example A7

3,5,5-Trimethyl-3-phenyl-4-(1-phenyl-ethoxy)-morpholin-2-one 107

To 18.3 g (78 mmol) 3,5,5-trimethyl-3-phenyl-morpholin-2-one-N-oxyl (prepared according to S. D. Rychnovsky et al., J. Org. Chem. 1998, 63, 6363), 12.0 g (117 mmol) CuCl and 25.0 ml (117 mmol) pentamethyl-diethlenetriamine, toluene (150 ml) is added. The green suspension is stirred and a solution of 11.0 ml (78 mmol) of 1-phenylethylbromide in toluene (50 ml) is slowly added during a period of 2 h. After complete addition, the suspension is stirred for 20 h, then filtered over Hyflo, washed with 1M HCl solution (2× 70 ml), water (70 ml) and brine (70 ml), dried over Na₂SO₄, filtered and concentrated under reduced pressure. 25.7 g (97%) of the title compound is obtained as a slightly yellow resin.

¹H-NMR (400 MHz, CDCl₃), δ (ppm): 7.70 d (1H), 7.54 d (1H), 7.39-7.20 m (7 H), 4.57, 4.51 2q (1H), 4.13, 3.93, 3.89, 3.70 4d (2H), 1.93, 1.66, 1.37, 1.36, 1.20, 0.62 6s (9H), 1.51, 1.27 2d (3H).

Example A8

3-Ethyl-5,5-dimethyl-3-phenyl-4-(1-phenyl-ethoxy)-morpholin-2-one 108

The compound is prepared in analogy to example A7 from 3-ethyl-5,5-dimethyl-3-phenyl-morpholin-2-one-N-oxyl in a yield of 95% as yellow liquid.

¹H-NMR (400 MHz, CDCl₃), δ (ppm): 7.70-7.16 m (10H), 5.24-5.08, 4.85-4.80 2m (1H), 3.99-3.50 m (2H), 2.45-0.57 m (14H).

Example A9

3-(4-Chloro-phenyl)-3,5,5-trimethyl-4-(1-phenyl-ethoxy)-morpholin-2-one

The compound is prepared in analogy to example A7 from 3,5,5-trimethyl-3-(4-chloro)phenyl-morpholin-2-one-N-oxyl in a yield of 78% as yellow resin.

¹H-NMR (400 MHz, CDCl₃), δ (ppm): 7.64 d (1H), 7.41-7.18 m (8H), 4.55-4.45 m (1H), 4.16, 3.98, 3.89, 3.74 4d (2H), 1.93, 1.68 2s (3H), 1.47, 1.25 2d (3H), 1.37, 1.36 2s (3H), 1.20, 0.68 2s (3H).

The prepared alkoxyamine-diols according to formula Ia and Ib are shown in table 2. They are prepared starting from the compounds 101 to 109.

TABLE 2

Alkoxyamine-diols according to formula (Ia) and (Ib).

| No | Structure |
|---|---|
| 201 | (structure shown) reference: not within the scope of the invention |
| 202 | (structure shown) |
| 203 | (structure shown) |

TABLE 2-continued

Alkoxyamine-diols according to formula (Ia) and (Ib).

| No | Structure |
|---|---|
| 204 | |
| 205 | |
| 206 | |
| 207 | |
| 208 | |
| 209 | |

Example A10

2-[(2-Hydroxy-1,1-dimethyl-ethyl)-(1-phenyl-ethoxy)-amino]-2-methyl-propan-1-ol 201

To a suspension of 2.93 (75 mmol) $LiAlH_4$ in THF (100 ml) is slowly added at 0-10° C. a solution of 13.9 g (50 mmol) of compound 101 in THF (50 ml). After complete addition, the suspension is heated to reflux and kept at this temperature for 5 h. The mixture is cooled in an ice-bath and saturated $NH_4Cl$-solution (25 ml) is added carefully. EtOAc (500 ml) and water (100 ml) is added, the phases separated and the organic layer washed with water (100 ml) and brine (100 ml), dried over $Na_2SO_4$, filtered and concentrated under reduced pressure to yield 13.2 g (94%) of the title compound as a white solid.

M.p.: 79-81° C.

Example A11

2-Ethyl-2-[(2-hydroxy-1,1-dimethyl-ethyl)-(1-phenyl-ethoxy)-amino]-butan-1-ol 202

The compound is prepared in analogy to example A10 from compound 102 in a yield of 73% after crystallization as white solid.

M.p.: 65-69° C.

Example A12

2-[(2-Hydroxy-1,1-dimethyl-ethyl)-(1-phenyl-ethoxy)-amino]-2-propyl-pentan-1-ol 203

The compound is prepared in analogy to example A10 from compound 103 in a yield of 83% after crystallization as white solid. M.p.: 88-92° C.

Example A13

2-[(2-Hydroxy-1,1-dimethyl-ethyl)-(1-phenyl-ethoxy)-amino]-2-methyl-heptan-1-ol 204

The compound is prepared in analogy to example A10 from compound 104 in a yield of 71% as yellow resin.
$^1$H-NMR (400 MHz, CDCl$_3$), δ (ppm): 7.39-7.26 m (5H), 4.83-4.75 m (1H), 3.79 -2.50 m (6H), 1.85-0.83 m (22H).

Example A14

2-[(1-Hydroxymethyl-cyclohexyl)-(1-phenyl-ethoxy)-amino]-2-methyl-propan-1-ol 205

The compound is prepared in analogy to example A10 from compound 105 in a yield of 77% after crystallization as white solid.
M.p.: 84-86° C.

Example A15

2-[(1-Hydroxymethyl-cycloheptyl)-(1-phenyl-ethoxy)-amino]-2-methyl-propan-1-ol 206

The compound is prepared in analogy to example A10 from compound 106 in a yield of 67% after crystallization as white solid.
M.p.: 68-72° C.

Example A16

2-[(2-Hydroxy-1,1-dimethyl-ethyl)-(1-phenyl-ethoxy)-amino]-2-phenyl-propan-1-ol 207

The compound is prepared in analogy to example A10 from compound 107 in a yield of 89% as yellow resin.
$^1$H-NMR (400 MHz, CDCl$_3$), δ (ppm): 7.54-7.17 m (10H), 5.07, 5.00 2q (1H), 4.02 -2.15 m (6H), 1.78, 1.67, 1.25, 1.03, 0.64, 0.56 6s (9H), 1.70, 1.62 2d (3H).

Example A17

2-[(2-Hydroxy-1,1-dimethyl-ethyl)-(1-phenyl-ethoxy)-amino]-2-phenyl-butan-1-ol 208

The compound is prepared in analogy to example A10 from compound 108 in a yield of 71% after crystallization as white solid.
M.p.: 94-104° C.

Example A18

2-(4-Chloro-phenyl)-2-[(2-hydroxy-1,1-dimethyl-ethyl)-(1-phenyl-ethoxy)-amino]-propan-1-ol 209

The compound is prepared in analogy to example A10 from compound 109 in a yield of 84% as yellow resin.
MS (DEP(CI)): MH$^+$=378

The prepared unsymmetrically substituted open chain alkoxyamine derivatives are shown in table 3 together with their amine and nitroxide precursors.

TABLE 3

| No | Structure |
|---|---|
| 301 | |
| 302 | |
| 303 | |
| 304 | |
| 305 | |

TABLE 3-continued

| No | Structure |
|----|-----------|
| 306 | 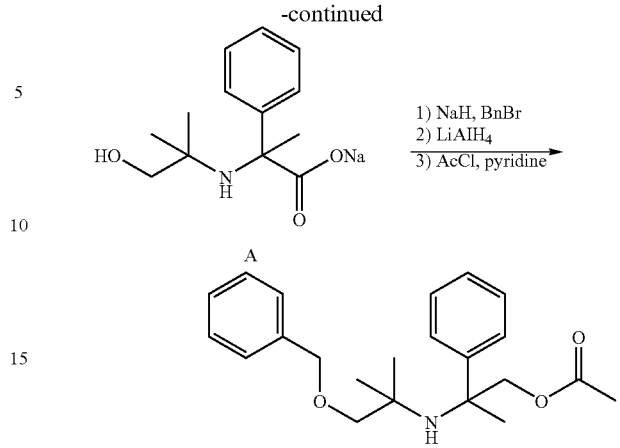 |
| 307 | |
| 308 | |

Example A19

Acetic Acid 2-(2-benzyloxy-1,1-dimethyl-ethylamino)-2-phenyl-propyl Ester 301

The amine 301 is prepared according to the following scheme:

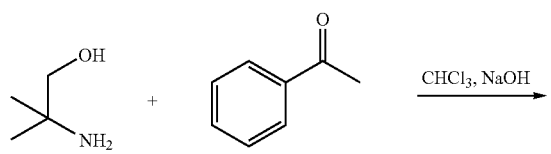

To a suspension of 183.8 g (2.0 mol) 2-amino-2-methyl-propanol, 239 ml (2.0 mol) acetophenone, and 123.7 g (3.0 mol) NaOH in 1,2-dimethoxyethane (500 ml) is slowly added 80.9 ml (1.0 mol) chloroform at 0-5° C. (ice-bath) over a period of 4.5 h. After complete addition, the temperature is raised slowly to ambient temperature and the brown suspension stirred overnight. Water (1 L) is added (exothermic), then tert-butylmethylether (1 L). Stirring is continued for 1 h, then the mixture transferred into a separation funnel, water and tert-butylmethylether added until the phases separate. The aqueous phase is evaporated to dryness and further dried under high vacuum to yield 151 g of a brown solid. The solid is suspended in $CH_2Cl_2$ (500 ml), stirred for 30 min, then filtered and dried to yield 79.9 g (31%) of the sodium salt A as beige solid.

To a suspension of 73.6 g (300 mmol) of the sodium salt A is added at room temperature 24.0 g (600 mmol) of a ca. 60% sodium hydride dispersion in oil. After stirring for 1 h 75.9 ml (660 mmol) benzylbromide is slowly added (exothermic, internal temperature is kept below 40° C. by cooling in a water-bath). After complete addition the mixture is stirred for 1 h, another 25.0 ml (217 mmol) benzylbromide are added, stirring continued for 1 h, another 15.0 ml (130 mmol) benzylbromide added, and stirring continued for another 2.5 h. The reaction mixture is carefully hydrolyzed, toluene (500 ml) is added and washed with water (2×250 ml) and brine (250 ml), dried ($Na_2SO_4$), filtered and evaporated. Side products are removed by distillation (0.1 mbar, 170° C. bath temperature) to yield 92.4 g (74%) of the dibenzylated compound as a brown liquid. A solution of 30.0 g (71.8 mmol) of this in THF (15 ml) is slowly added to a suspension of $LiAlH_4$ in THF (150 ml), maintaining the internal temperature below 20° C. by cooling (ice-bath). After complete addition, the reaction mixture is heated to reflux for 2.5 h, then cooled to 0° C. (ice-bath) and carefully hydrolyzed. EtOAc (250 ml) is added, the organic phase washed with water (2×100 ml), the aqueous phases extracted with EtOAc (250 ml), the combined organic phases washed with brine (100 ml), dried ($Na_2SO_4$), filtered and evaporated. Benzylalcohol is removed by distillation (0.1 mbar, 140° C. bath temperature) to yield 22.5 g (71.8 mmol; 100%) of the reduced compound as a brown liquid. This is dissolved in $CH_2Cl_2$ (100 ml), 7.0 ml (86.1 mmol) pyridine added, then 6.10 ml (86.1 mmol) of acetylchloride slowly added (exothermic, temperature is kept below 30° C. by cooling in a water bath). After complete addition, the solution is stirred at ambient temperature for 16 h, washed with 1M $K_2CO_3$ solution (100 ml) and brine (100 ml), dried (Na$_2$SO$_4$), filtered and evaporated to yield 26.35 g (103%) compound 301 as brown liquid.

$^1$H-NMR (400 MHz, CDCl$_3$), δ (ppm): 7.56-7.54 d (2H), 7.35-7.20 m (8H), 4.46 s (2H), 3.98 s (2H), 3.20 d (1H), 3.08 d (1H), 2.19 br s (1H), 1.96 s (3H), 1.63 s (3H), 0.90 s (3H), 0.89 s (3H).

Example A20

Acetic Acid 2-(2-benzyloxy-1,1-dimethyl-ethylamino)-2-phenyl-butyl ester 302

The compound is prepared in analogy to example A19 using propiophenone instead of acetophenone. Colorless liquid.

$^1$H-NMR (400 MHz, CDCl$_3$), δ (ppm): 7.45 m (2H), 7.35-7.20 m (8H), 4.58-4.47 m (4H), 3.08 s (2H), 2.04 s (3H), 1.85-1.76 m (2H), 0.92 s (3H), 0.81 s (3H), 0.62 t (3 H).

Example A21

Acetic Acid 2-(2-benzyloxy-1,1-dimethyl-ethylamino)-2-phenyl-propyl ester-N-oxyl 303

To a solution of 26.4 g (71.8 mmol) of 301 in toluene (70 ml) is added at the same time a 30% aq. NaOH solution (30 ml) and 23.2 ml (140 mmol) of a 40% solution of peracetic acid in acetic acid (exothermic, internal temperature is kept below 20° C. by cooling in an ice-bath). After complete addition, the emulsion is stirred at ambient temperature for 1.5 h, filtered over hyflo, the organic phase washed with 20% aq. Na$_2$SO$_3$ solution (2×50 ml), water (50 ml) and brine (50 ml), dried (Na$_2$SO$_4$), filtered and evaporated. The residue is purified by flash chromatography over silicagel (hexane/EtOAc 5:1) to give 10.9 g (41%) of the title compound as orange solid.

M.p.: 42-49° C. MS (DEP(CI)): MH$^+$371.

Example A22

Acetic Acid 2-(2-benzyloxy-1,1-dimethyl-ethylamino)-2-phenyl-butyl ester-N-oxyl 304

The compound is prepared in analogy to example A21 from compound 302 in a yield of 83% as brown liquid. MS (DEP(CI)): MH$^+$=385.

Example A23

Acetic Acid 2-[(2-benzyloxy-1,1-dimethyl-ethyl)-(1-phenyl-ethoxy)-amino]-2-phenyl-propyl Ester 305

The compound is prepared in analogy to example A7 from compound 303 in a yield of 48% as yellowish liquid.

$^1$H-NMR (400 MHz, CDCl$_3$), δ (ppm): 7.56-7.13 m (15H), 4.97/4.93 2q (1H), 4.50, 4.47, 4.29, 4.02, 3.67, 3.55, 3.43, 3.16, 2.94, 2.62 10d (5H), 4.03 s (1H), 1.79, 1.74 2s (3H), 1.61-1.53 2d+s (4.5H), 1.43, 1.22, 1.05, 0.81, 0.61 5s (7.5H).

Example A24

2-[(2-Benzyloxy-1,1-dimethyl-ethyl)1-phenylethoxy)-amino]-2-phenyl-propan-1-ol 306

A solution of 15.3 g (32 mmol) of compound 305 in diethylether (35 ml) is slowly added to a suspension of 1.26 g (32 mmol) LiAlH$_4$ in diethylether (95 ml). The internal temperature is kept below 10° C. by cooling with an ice-bath. After complete addition, stirring is continued at room temperature for 1.5 h. The mixture is cooled to 0° C. and carefully hydrolyzed. The suspension is filtered, the organic phase washed with water (50 ml) and brine (100 ml), dried (Na$_2$SO$_4$), filtrated and evaporated. The residue is purified by flash chromatography over silicagel (hexane/EtOAc 8:1) to give 5.42 g (40%) of the title compound as yellowish liquid.

$^1$H-NMR (400 MHz, CDCl$_3$), δ (ppm): 7.62-7.16 m (15H), 5.09, 5.00 2q (1H), 4.51 AB (1H), 4.05 AB (1H), 4.04, 3.44, 3.09, 2.94 4dd (3H), 3.60, 2.68 2d (1H), 2.54-2.51, 2.26-2.20 2m (1H), 1.77, 1.55, 1.18, 1.05, 0.82, 0.70 6s (9H), 1.66, 1.54 2d (3H).

Example A25

Acetic Acid 2-[(2-benzyloxy-1,1-dimethyl-ethyl)-(1-phenyl-ethoxy)-amino]-2-phenyl-butyl Ester 307

The compound is prepared in analogy to example A7 from compound 304 in a yield of 70% as yellowish liquid.

$^1$H-NMR (400 MHz, CDCl$_3$), δ (ppm): 7.62-7.16 m (15H), 4.97-0.25 m (24H).

Example A26

2-[(2-Benzyloxy-1,1-dimethyl-ethyl)-(1-phenylethoxy)-amino]-2-phenyl-butan-1-ol 308

The compound is prepared in analogy to example A24 from compound 307 in a yield of 87% as colorless resin.

$^1$H-NMR (400 MHz, CDCl$_3$), δ (ppm): 7.562-7.21 m (15H), 4.97-0.15 m (21H).

EA: required C=77.82, H=8.33, N=3.13; found: C=77.85, H=8.61, N=3.03.

The prepared symmetrically O-substituted alkoxyamines according to formula Ia and Ib are shown in table 4.

TABLE 4

| No. | Structure |
|---|---|
| 401 | 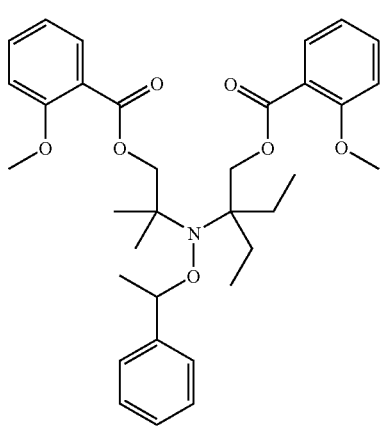 |

TABLE 4-continued
| No. | Structure |
|---|---|
| 402 | 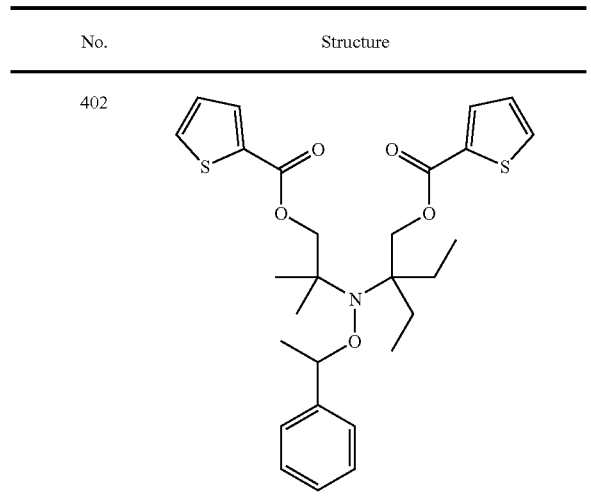 |
| 403 | 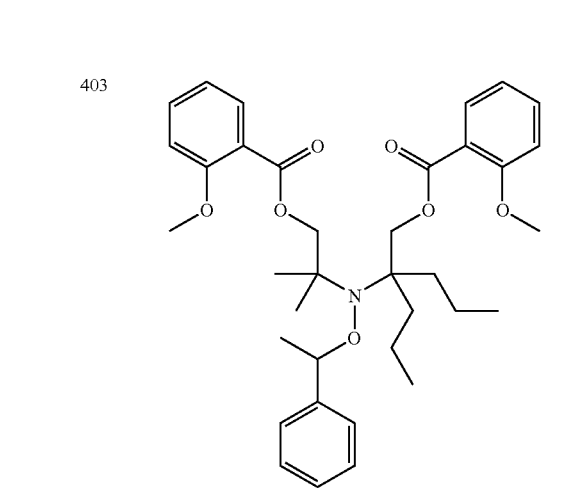 |
| 404 | 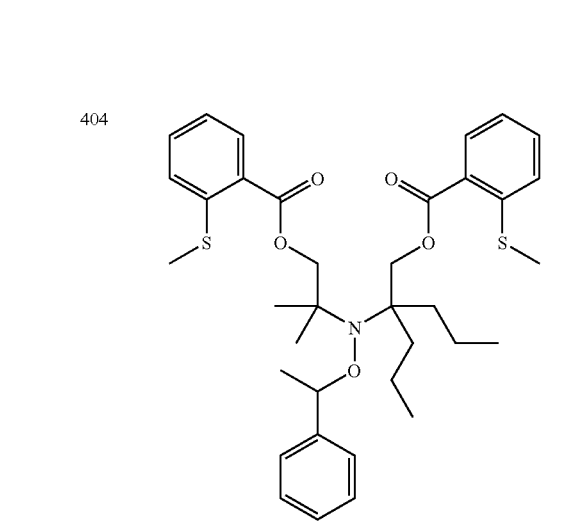 |
| 405 | 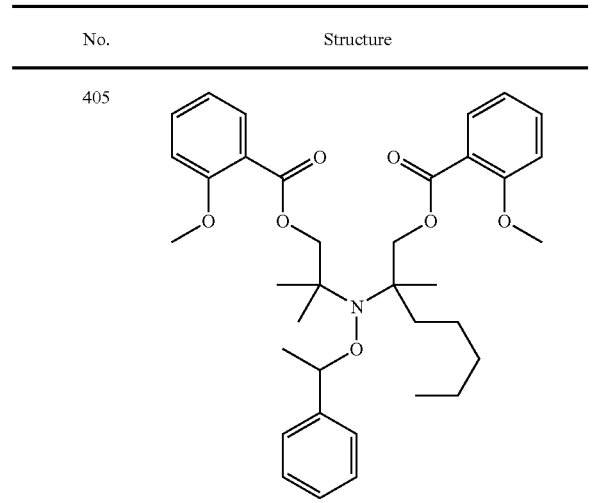 |
| 406 | 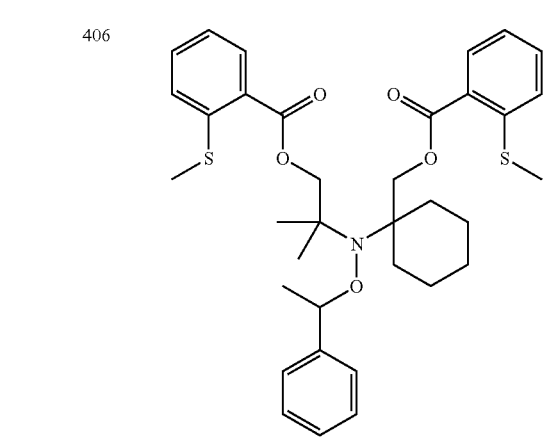 |
| 407 | 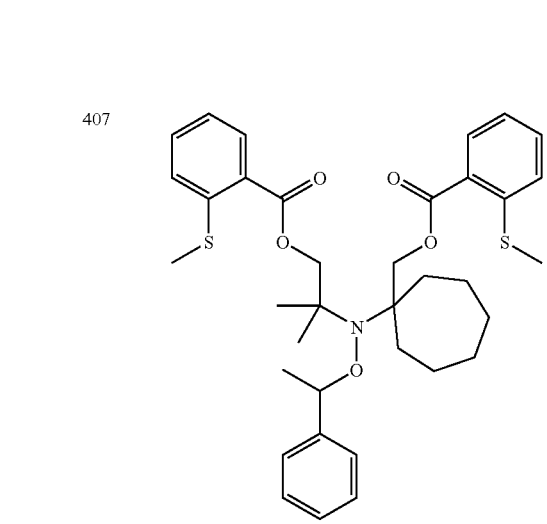 |

TABLE 4-continued

| No. | Structure |
|---|---|
| 408 | |
| 409 | |
| 410 | |

Example A27

O,O'-Di-(2-Methoxybenzoyl)-(2-Ethyl-2-[(2-hydroxy-1,1-dimethyl-ethyl)-(1-phenyl-ethoxy)-amino]-butan-1-ol}401

To a solution of 4.64 g (15 mmol) of compound 202 in CH$_2$Cl$_2$ (45 ml) is added 3.60 ml (45 mmol) pyridine. 5.0 ml (36 mmol) 2-methoxybenzoylchloride is slowly added while keeping the internal temperature at ambient temperature by cooling with a water-bath. After complete addition, 0.18 g (1.5 mmol) dimethylaminopyridine is added and the mixture is stirred for 70 h. The resulting yellow suspension is diluted with CH$_2$Cl$_2$ (150 ml), the organic layer washed with 1M HCl (50 ml), water (50 ml) and brine (50 ml), then dried over Na$_2$SO$_4$, filtered and concentrated under reduced pressure. The residue is purified by flash chromatography over silicagel (hexane/EtOAc 3:1) to give 6.94 g (80%) of the title compound as yellow resin.

$^1$H-NMR (400 MHz, CDCl$_3$), δ (ppm): 7.93-7.88 m (1H), 7.84-7.79 m (1H), 7.51 -7.41 m (2H), 7.31-7.23 m (5H), 7.00-6.90 m (4H), 4.84 m (1H), 4.66-4.05 6d (3H), 3.91 -3.86 m (7H), 1.94-1.60 m (4H), 1.58-1.56 m (3H), 1.52, 1.42, 1.34, 1.24 4s (6H), 1.11, 1.02, 0.93, 0.79 4t (6 H).

Example A28

O,O'-Di-(Thiophene-2-carbonyl)-{2-ethyl-2-[(2-hydroxy-1,1-dimethyl-ethyl)-(1-phenyl-ethoxy)-amino]-butan-1-ol}402

The compound is prepared in analogy to example A27 from compound 202 and 2-thiophene-carboxylic acid chloride in a yield of 78% as yellow resin.

$^1$H-NMR (400 MHz, CDCl$_3$), δ (ppm): 7.88-7.72 m (2H), 7.60-7.51 m (2H), 7.31 -7.24 m (5H), 7.16-7.05 m (2H), 4.85-4.79 m (1H), 4.65-3.72 8d (4H), 1.96-1.60 m (4H), 1.55 d (3H), 1.51, 1.42, 1.35, 1.18 4s (6H), 1.13, 1.08, 0.95, 0.81 4t (6H).

Example A29

O,O'-Di-(2-Methoxybenzoyl)-{2-[(2-Hydroxy-1,1-dimethyl-ethyl)-(1-phenyl-ethoxy)-amino]-2-propyl-penta-1-ol}403

The compound is prepared in analogy to example A27 from compound 203 and 2-methoxybenzoyl chloride in a yield of 87% as colorless resin.

$^1$H-NMR (400 MHz, CDCl$_3$), δ (ppm): 7.93-7.81 m (2H), 7.51-7.44 m (2H), 7.29 -7.22 m (5H), 7.01-6.93 m (4H), 4.85-4.77 m (1H), 4.66-4.03 m (3H), 3.91-3.83 m (7H), 1.88-1.14 m (17H), 0.91-0.61 m (6H).

Example A30

O,O'-Di-(2-Methylthiobenzoyl)-{2-[(2-Hydroxy-1,1-dimethyl-ethyl)-(1-Phenyl-ethoxy)-amino]-2-Propyl-Pentan-1-ol}404

The compound is prepared in analogy to example A27 from compound 203 and 2-(methylthio)benzoyl chloride in a yield of 71% as slightly yellow resin.

$^1$H-NMR (400 MHz, CDCl$_3$), δ (ppm): 8.18-7.96 m (2H), 7.52-7.44 m (2H), 7.30 -7.10 m (9H), 4.82-3.84 m (5H), 2.46-2.44 m (6H), 1.84-1.05 m (17H), 0.93-0.60 m (6H).

Example A31

O,O'-Di-(2-Methoxybenzoyl)-{2-[(2-Hydroxy-1,1-dimethyl-ethyl)-(1-phenyl-ethoxy)-amino]-2-methyl-heptan-1-ol}405

The compound is prepared in analogy to example A27 from compound 204 and 2-methoxybenzoyl chloride in a yield of 84% as slightly yellow resin.

$^1$H-NMR (400 MHz, CDCl$_3$), δ (ppm): 7.95-7.80 m (2H), 7.52-7.42 m (2H), 7.32-7.20 m (5H), 7.00-6.90 m (4H), 4.84-4.82 m (1H), 4.58-3.86 m (10H), 1.90-0.80 m (23H).

Example A32

O,O'-Di-(2-Methylthiobenzoyl)-{2-[(1-Hydroxymethyl-cyclohexyl)-(1-phenyl-ethoxy)-amino]-2-methyl-propan-1-ol}406

The compound is prepared in analogy to example A27 from compound 205 and 2-(methylthio)benzoyl chloride in a yield of 87% as colorless resin.

$^1$H-NMR (400 MHz, CDCl$_3$), δ (ppm): 8.16-8.02 m (2H), 7.52-7.43 m (2H), 7.30-7.22 m (7H), 7.15-7.06 m (2H), 4.94-4.88 m (1H), 4.76-3.95 8d (4H), 2.48-2.44 m (6H), 2.10-1.10 m (19H).

Example A33

O,O'-Di-(2-Methylthiobenzoyl)-{2-[(1-Hydroxymethyl-cycloheptyl)-(1-phenyl-ethoxy)-amino]-2-methyl-propan-1-ol}407

The compound is prepared in analogy to example A27 from compound 206 and 2-(methylthio)benzoyl chloride in a yield of 64% as colorless resin.

$^1$H-NMR (400 MHz, CDCl$_3$), δ (ppm): 8.16-7.95 m (2H), 7.51-7.42 m (2H), 7.30-7.25 m (7H), 7.15-7.00 m (2H), 4.93-4.86 m (1H), 4.63-3.76 8d (4H), 2.47-2.44 m (6H), 2.18-1.22 m (21H).

Example A34

O,O'-Di-(2-Methoxybenzoyl)-{2-[(2-Hydroxy-1,1-dimethyl-ethyl)-(1-phenyl-ethoxy)-amino]-2-phenyl-propan-1-ol} 408

The compound is prepared in analogy to example A27 from compound 207 and 2-methoxybenzoyl chloride in a yield of 81% as colorless resin.

$^1$H-NMR (400 MHz, CDCl$_3$), δ (ppm): 7.91-6.77 m (18H), 5.18-3.58 (m, 11H), 1.86-0.65 m (12H).

Example A35

N-(2-Benzyloxy-1,1-dimethyl-ethyl)-.N.-(2-benzyloxy-1-methyl-1-phenyl-ethyl)-.O.-(1-phenyl-ethyl)-hydroxylamine 409

To a solution of 5.0 g (14.6 mmol) of compound 207 in THF (50 ml) is added 1.46 g (36.4 mmol) of a ca. 60% NaH dispersion in oil. The resulting suspension is stirred at ambient temperature for 1 h, then cooled to 0° C. (ice-bath) and 3.60 ml (29.8 mmol) benzylbromide added slowly. The temperature is slowly raised to ambient temperature and the reaction mixture stirred for 46 h, then again cooled to 0° C. and hydrolyzed. Toluene (100 ml) is added, the organic phase washed with water (2×100 ml) and brine (100 ml), dried (Na$_2$SO$_4$), filtrated and evaporated. The residue is purified by flash chromatography over silicagel (hexane/EtOAc 20:1) to give 2.81 g (37%) of the title compound as yellow resin.

$^1$H-NMR (400 MHz, CDCl$_3$), δ (ppm): 7.66-6.69 m (20H), 4.96, 4.88 2q (1H), 4.56 -2.57 m (9H), 1.74-0.47 m (12H).

Example A36

.N.-(2-Benzyloxy-1,1-dimethyl-ethyl)-.N.-(2-benzyloxy-1-ethyl-1-phenyl-ethyl)-.O.-(1-phenyl-ethyl)-hydroxylamine 410

To a solution of 7.15 g (20 mmol) of compound 208 in toluene 100 ml) is added 2.0 g (50 mmol) of a ca. 60% NaH dispersion in oil at 0° C. The resulting suspension is stirred at ambient temperature for 1 h, then again cooled to 0° C. (ice-bath) and 5.10 ml (42 mmol) benzylbromide added slowly. The temperature is slowly raised to ambient temperature. After 4 h DMF (50 ml) is slowly added (exothermic!). The reaction mixture is stirred overnight, then again cooled to 0° C. and hydrolyzed. Toluene (100 ml) is added, the organic phase washed with water (2×100 ml) and brine (100 ml), dried (Na$_2$SO$_4$), filtrated and evaporated. The residue is purified by flash chromatography over silicagel (hexane/EtOAc 20:1) to give 9.4 g (87%) of the title compound as yellow resin. $^1$H-NMR (400 MHz, CDCl$_3$), δ (ppm): 7.67-6.70 m (20H), 4.96-4.70 m (1H), 4.56-1.85 m (11H), 1.53-0.40 m (12H).

B) EXAMPLES FOR POLYMERIZATIONS

General Remarks:

Styrene (Merck), methylmethacrylate (MMA, Merck), n-butylacrylate (Merck) and tert-butylbenzene (Aldrich) are distilled over a Vigreux column under vacuum, shortly before being used. Acrylonitrile is used as obtained from Aldrich.

To remove oxygen, the polymerization reaction mixtures are degassed in three consecutive freeze-thaw-cycles and then purged with argon or nitrogen before polymerization. The reaction mixtures are then polymerized under argon/nitrogen atmosphere. The temperatures given are bath-temperatures.

At the start of the polymerization reaction, all starting materials are homogeneously dissolved.

Unreacted monomer is removed from the polymer by heating at a pressure of torr until constant weight is achieved. Conversion is determined by weighing the remaining polymer and subtracting the weight of the initiator. The statistical copolymers (Sty/AN) are precipitated with methanol, dryed at 40° C. and 1 torr until constant weight is achieved. Conversion is determined by weighing the residual.

The styrene/acrylonitrile copolymerization is carried out in a Buchi miniclave drive bmc dr (200 ml glass reactor vessel having following features: reverse bursting disc 10 bar; temperature and pressure control; propeller stirrer (3 arms): torque 75 Ncm; speed 250 rpm (max.); temperature 250° C. (max.); pressure rating 100 bar (max.); material of closing cap 1.4435 Hastelloy C22; material of bearings PFTE/graphite; stirrer shaft 8 mm.

Characterization of the polymers is carried out by GPC (Gel Permeation Chromatography).

GPC: Is performed using RHEOS 4000 of FLUX INSTRUMENTS. Tetrahydrofuran (THF) is used as a solvent and is pumped at 1 m/min. Two chromatography columns are put in series: type PIgel 5 µm mixed-C of POLYMER INSTRUMENTS, Shropshire, UK. Or by a Hewlett Packart HP 1090 LC (column PSS 1, length 60 cm. Elution is done with tetrahydrofurane (THF), rate 1m/min, concentration 10 mg polymer in 1 ml THF, Measurements are performed at 40° C. The columns are calibrated with low polydispersity polystyrenes having Mn from 200 to 2 000 000 Dalton. Detection is carried out using a RI- and UV-detection. The polydispersity is calculated from $M_n$ (g/mol) and $M_w$ (g/mol) as PD=$M_w/M_n$.

Polymerization of Styrene:

Example B1

Polymerization with 1 mol % of Compound 204 at 100° C.

In a 100 ml Schlenck-flask with stopper and magnetic stirrer, are placed 1.47 g (4.35 mmol) of compound 204 and 45.3 g (435 mmol) of styrene and degassed. The clear solution is then stirred at 100° C. for 6 h. The residual monomer is removed under high vacuum at 70° C. 28.4g (63%) of the monomer is converted and a slightly yellow foam is obtained.
Mn=7930, Mw=10590, PD=1.34

Example B2

Polymerization with 1 mol % of Compound 205 at 100° C.

In a 100 ml Schlenck-flask with stopper and magnetic stirrer, are placed 1.40 g (4.35 mmol) of compound 205 and 45.3 g (435 mmol) of styrene and degassed. The clear solution is then stirred at 100° C. for 6 h. The residual monomer is removed under high vacuum at 70° C. 21.7 g (48%) of the monomer is converted and a slightly yellow foam is obtained.
Mn=5130, Mw=6180, PD=1.20

Example B3

Polymerization with 0.1 mol % of Compound 205 at 100° C.

In a 100 ml Schlenck-flask with stopper and magnetic stirrer, are placed 0.14 g (0.44 mmol) of compound 205 and 45.3 g (435 mmol) of styrene and degassed. The clear solution is then stirred at 100° C. for 6 h. The residual monomer is removed under high vacuum at 70° C. 12.6 g (28%) of the monomer is converted and a slightly yellow foam is obtained.
Mn=27350, Mw=34750, PD=1.27

Example B4

Polymerization with 1 mol % of Compound 207 at 100° C.

In a 100 ml Schlenck-flask with stopper and magnetic stirrer, are placed 1.49 g (4.35 mmol) of compound 207 and 45.3 g (435 mmol) of styrene and degassed. The clear solution is then stirred at 100° C. for 6 h. The residual monomer is removed under high vacuum at 70° C. 30.7 g (68%) of the monomer is converted and a slightly yellow foam is obtained.
Mn=7520, Mw=9300, PD=1.24

Example B5

Polymerization with 1 mol % of Compound 208 at 100° C.

In a 100 ml Schlenck-flask with stopper and magnetic stirrer, are placed 1.56 g (4.35 mmol) of compound 208 and 45.3 g (435 mmol) of styrene and degassed. The clear solution is then stirred at 100° C. for 3 h. The residual monomer is removed under high vacuum at 70° C. 44.6 g (95%) of the monomer is converted and a slightly yellow foam is obtained.
Mn=10000, Mw=16400, PD=1.63

Example B6

Polymerization with 0.1 mol % of Compound 208 at 100° C.

In a 100 ml Schlenck-flask with stopper and magnetic stirrer, are placed 0.156 g (0.435 mmol) of compound 208 and 45.3 g (435 mmol) of styrene and degassed. The clear solution is then stirred at 100° C. for 6 h. The residual monomer is removed under high vacuum at 70° C. 17.0 g (37%) of the monomer is converted and a slightly yellow foam is obtained.
Mn=46300, Mw=74000, PD=1.60

Example B7

Polymerization with 1 mol % of Compound 209 at 100° C.

In a 100 ml Schlenck-flask with stopper and magnetic stirrer, are placed 1.96 g (4.35 mmol) of compound 209 and 45.3 g (435 mmol) of styrene and degassed. The clear solution is then stirred at 100° C. for 6 h. The residual monomer is removed under high vacuum at 70° C. 34.9 g (73%) of the monomer is converted and a slightly yellow foam is obtained.
Mn=9700, Mw=12100, PD=1.25

Example B8

Polymerization with 1 mol % of Compound 306 at 100° C.

In a 100 ml Schlenck-flask with stopper and magnetic stirrer 1.89 g (4.35 mmol) of compound 306 and 45.3 g (435 mmol) of styrene are placed and degassed. The clear solution is then stirred at 100° C. for 5 h. The residual monomer is removed under high vacuum at 40° C. 42.5 g (94%) of the monomer is converted and a slightly yellow foam is obtained.
Mn=10000, Mw=11600, PD=1.27

Example B9

Polymerization with 1 mol % of Compound 307 at 75°C.

In a 100 ml Schlenck-flask with stopper and magnetic stirrer, are placed 2.13 g (4.35 mmol) of compound 307 and 45.3 g (435 mmol) of styrene and degassed. The clear solution is then stirred at 75° C. for 6 h. The residual monomer is removed under high vacuum at 40° C. 19.3 g (38%) of the monomer is converted and a slightly yellow foam is obtained.
Mn=3130, Mw=5010, PD=1.60

Example B10

Polymerization with 1 mol % of Compound 308 at 85° C.

In a 100 ml Schlenck-flask with stopper and magnetic stirrer 1.95 g (4,36 mmol) of compound 308 and 45.45 g (436 mmol) of styrene are placed and degassed. The clear solution is then stirred at 85° C. for 6 h. The residual monomer is removed under high vacuum at 40° C. 44.5 g (94%) of the monomer is converted and a slightly yellow foam is obtained.
Mn=12050, Mw=14890, PD=1.24

Example B11

Reinitiation of Polymer B10 with MMA at 85° C.

In a 100 ml Schlenck-flask with stopper and magnetic stirrer 2.50 g of polymer B10 (Mn=12050) and 15.0 g (150 mmol) of MMA are placed and degassed. The clear solution is then stirred at 85° C. for 6 h. The residual monomer is removed under high vacuum at 40° C. 2.99 g (19.9%) of the monomer is converted and a colorless foam is obtained.
Mn=46590, Mw=85150, PD=1.8

Example B12

Polymerization with 1 mol % of Compound 401 at 100° C.

In a 100 ml Schlenck-flask with stopper and magnetic stirrer 2.51 g (4.35 mmol) of compound 412 and 45.3 g (435 mmol) of styrene are placed and degassed. The clear solution is then stirred at 100° C. for 6 h. The residual monomer is removed under high vacuum at 70° C. 22.5 g (50%) of the monomer is converted and a slightly yellow foam is obtained.
Mn=8610, Mw=10990, PD=1.28

Example B13

Polymerization with 0.1 mol % of Compound 401 at 100° C.

In a 100 ml Schlenck-flask with stopper and magnetic stirrer 0.25 g (0.44 mmol) of compound 412 and 45.3 g (435 mmol) of styrene are placed and degassed. The clear solution is then stirred at 100° C. for 6 h. The residual monomer is removed under high vacuum at 70° C. 19.3 g (43%) of the monomer is converted and a slightly yellow foam is obtained.
Mn=42800, Mw=56400, PD=1.32

Example B14

Polymerization with 1 mol % of Compound 408 at 100° C.

In a 100 ml Schlenck-flask with stopper and magnetic stirrer 2.67 g (4.36 mmol) of compound 419 and 45.4 g (436 mmol) of styrene are placed and degassed. The clear solution is then stirred at 100° C. for 6 h. The residual monomer is removed under high vacuum at 70° C. 24.2 g (53%) of the monomer is converted and a slightly yellow foam is obtained.
Mn=5520, Mw=7430, PD=1.35

Example B15

Polymerization with 1 mol % of Compound 208 at 85° C.

In a 100 ml Schlenck-flask with stopper and magnetic stirrer 1.56 g (4.35 mmol) of compound 306 and 45.3 g (435 mmol) of styrene are placed and degassed. The clear solution is then stirred at 85° C. for 6 h. The residual monomer is removed under high vacuum at 40° C. 20.4 g (42%) of the monomer is converted and a slightly yellow foam is obtained.
Mn=4200, Mw=5160, PD=1.23

Example B16

Polymerization with 1 mol % of Compound 208 at 85° C. with additional initiator

In a 100 ml Schlenck-flask with stopper and magnetic stirrer are placed 1.56 g (4.35 mmol) of compound 306, 0.105 g (0.435 mmol) of benzoylperoxide, and 45.3 g (435 mmol) of styrene and degassed. The clear solution is then stirred at 85° C. for 6 h. The polymer is dissolved in $CH_2Cl_2$ (50 ml) and precipitated from 500 ml MeOH. The precipitation is repeated and the resulting white powder dried under high vacuum to yield 34.5 g (72%) of polymer.
Mn=6890, Mw=9070, PD=1.32

Example B17

Reinitiation of Polymer B16 at 85° C.

In a 100 ml Schlenck-flask with stopper and magnetic stirrer 2.50 g of polymer B16 (Mn=6890) and 10.0 g (96 mmol) of styrene are placed and degassed. The clear solution is then stirred at 85° C. for 6 h. The residual monomer is removed under high vacuum at 40° C. 3.09 g (31%) of the monomer is converted and a colorless foam is obtained.
Mn=13900, Mw=23300, PD=1.67

Example B18

Polymerization with 0.25 mol % of Compound 410 at 85° C.

In a 100 ml Schlenck-flask with stopper and magnetic stirrer 0.59 g (1.10 mmol) of compound 410 and 45.3 g (435 mmol) of styrene are placed and degassed. The clear solution is then stirred at 85° C. for 6 h. The residual monomer is removed under high vacuum at 40° C. 9.20 g (18.9%) of the monomer is converted and a colorless foam is obtained.
Mn=11590, Mw=14990, PD=1.29

Example B19

Reinitiation of Polymer B17 with n-BuA at 85° C.

In a 100 ml Schlenck-flask with stopper and magnetic stirrer 2.50 g of polymer B17 (Mn=11590) and 15.0 g (117 mmol) of n-butylacrylate (n-BuA) are placed and degassed. The clear solution is then stirred at 85° C. for 6 h. The residual monomer is removed under high vacuum at 40° C. 10.1 g (67.3%) of the monomer is converted and a colorless foam is obtained.
Mn=146600, Mw=259600, PD=1.8

Example B20

Polymerization with 1.0 mol % of Compound 410 at 85° C.

In a 100 ml Schlenck-flask with stopper and magnetic stirrer 2.35 g (4.37 mmol) of compound 410 and 45.3 g (435 mmol) of styrene are placed and degassed. The clear solution is then stirred at 85° C. for 6 h. The residual monomer is removed under high vacuum at 40° C. 24.57 g (48.9%) of the monomer is converted and a colorless foam is obtained.
Mn=4340, Mw=5600, PD=1.29

Example B21

Reinitiation of Polymer B19 with MMA at 85° C.

In a 100 ml Schlenck-flask with stopper and magnetic stirrer 2.50 g of polymer B19 (Mn=4340) and 15.0 g (150 mmol) of MMA, are placed and degassed. The clear solution is then stirred at 85° C. for 6 h. The residual monomer is removed under high vacuum at 40° C. 5.69 g (37.9%) of the monomer is converted and a colorless foam is obtained.
Mn=14780, Mw=30510, PD=2.1 Polymerization of n-butyl acrylate:

Example B22

Polymerization with 1.5 mol % of Compound 208 at 120° C.

In a 25 ml three neck flask, equipped with thermometer, cooler and magnetic stirrer, 0.418 g (1.17 mmol) of compound 208 and 10.0 g (78.0 mmol) of n-butylacrylate are mixed and degassed. The clear solution obtained is heated under argon to 120° C. and polymerization is carried out during 5 h. The remaining monomer is removed by evaporation under high vacuum at 80° C. 8.0 g (80%) of the initial monomer have reacted. A clear colorless viscous fluid is obtained.
Mn=5150, Mw=8040, PD=1.56

Example B23

Polymerization with 1.5 mol % of Compound 208 at 100° C.

In a 25 ml three neck flask, equipped with thermometer, cooler and magnetic stirrer, 0.418 g (1.17 mmol) of compound 208 and 10.0 g (78 mmol) of n-butylacrylate are mixed and degassed. The clear solution obtained is heated under argon to 100° C. and polymerization is carried out during 20 h. The remaining monomer is removed by evaporation under high vacuum at 50° C. 9.80 g (98%) of the initial monomer have reacted. A clear colorless viscous fluid is obtained.
Mn=5150, Mw=8540, PD=1.66

Example B24

Polymerization with 1.5 mol % of Compound 209 at 100° C.

In a 25 ml three neck flask, equipped with thermometer, cooler and magnetic stirrer, 0.528 g (1.17 mmol) of compound 209 and 10.0 g (78 mmol) of n-butylacrylate are mixed and degased. The clear solution obtained is heated under argon to 100° C. and polymerization is carried out during 3 h. The remaining monomer is removed by evaporation under high vacuum at 50° C. 9.41 g (94%) of the initial monomer have reacted. A clear colorless viscous fluid is obtained.
Mn=7670, Mw=14300, PD=1.87

Example B25

Polymerization with 1.5 mol % of Compound 307 at 100° C.

In a 25 ml three neck flask, equipped with thermometer, cooler and magnetic stirrer, 0.573 g (1.17 mmol) of compound 307 and 10.0 g (78 mmol) of n-butylacrylate are mixed and degased. The clear solution obtained is heated under argon to 100° C. and polymerization is carried out during 3 h. The remaining monomer is removed by evaporation under high vacuum at 50° C. 7.22 g (72%) of the initial monomer have reacted. A clear colorless viscous fluid is obtained.
Mn=5340, Mw=9290, PD=1.74

Example B26

Reinitiation of Polymer B24 at 100° C.

In a 25 ml three neck flask, equipped with thermometer, cooler and magnetic stirrer, 2.50 g of poly-butylacrylate B24 and 10 g (96 mmol) of styrene are mixed and degased. The clear solution obtained is heated under argon to 100° C. and polymerization is carried out during 6 h. The remaining monomer is removed by evaporation under high vacuum at 40° C. 4.88 g (49%) of the initial monomer have reacted. A clear colorless viscous fluid is obtained.
Mn=32600, Mw=51900, PD=1.59

Example B27

Polymerization with 0.25 mol % of Compound 410 at 85° C.

In a Schlenck-flask 0.59 g (1.1 mmol) of compound 410 and 55.9 g (436 mmol) n-BuA are dissolved in 100 ml tert-butylbenzene and degassed. The clear solution obtained is heated under argon to 85° C. and polymerization is carried out during 6 h. The remaining monomer and the solvent are removed by evaporation under vacuum at 40° C. 31.1 g (55.7%) of the initial monomer have reacted. A clear colorless vicous fluid is obtained.
Mn=72740, Mw=133400, PD=1.8

Example B28

Reinitiation of Polymer B27 with MMA at 85° C.

In a 100 ml Schlenck-flask with stopper and magnetic stirrer 2.50 g of polymer B27 (Mn=72740) and 15.0 g (150 mmol) of MMA are placed and degassed. The clear solution is then stirred at 85° C. for 6 h. The residual monomer is removed under vacuum at 40° C. 11.6 g (77.0%) of the monomer is converted and a colorless solid is obtained.
Mn=125300, Mw=207000, PD=1.7

Statistical Copolymers with Styrene (sty)/Acrylonitrile (AN)

Example B29

Polymerization of Sty/AN (3:1) with 0.25% mol % of Compound 410

In the autoclave, equipped with a thermometer and a magnetic stirrer, 75 g (720 mmol) styrene and 25 g (471 mmol) acrylonitrile are mixed and stirred with 500 U/min. After addition of 1.6 g (3.0 mmol) of compound 410 the homogenous solution is cooled in an ice bath and degassed with argon for 30 min. The solution is then heated to 85° C. and polymerization is carried out during 6 h. After cooling down to room temperature the statistical polymer is precipitated in methanol and dried in a vacuum oven at 40° C. The polymer is obtained with 42.2% conversion as a white solid.

$Mn=21630$, $Mw=28620$, $PD=1.3$

Example B30

Polymerization of sty/AN (1:1) with 0.25% mol % of Compound 410

In the autoclave, equipped with a thermometer and a magnetic stirrer, 50 g (480 mmol) styrene and 50 g (942 mmol) acrylonitrile are mixed and stirred with 500 U/min. After addition of 1.9 g (3.5 mmol) of compound 410 the homogenous solution is cooled in an ice bath and degassed with argon for 30 min. The solution is then heated to 85° C. and polymerization is carried out during 6 h. After cooling down to room temperature the statistical polymer is precipitated in methanol and dried in a vacuum oven at 40° C. The polymer is obtained with 31.1% conversion as a white solid.

$Mn=15730$ $Mw=21920$, $PD=1.4$

Example B31

Polymerization of sty/AN (1:3) with 0.25% mol % of Compound 410

In the autoclave, equipped with a thermometer and a magnetic stirrer, 25 g (240 mmol) styrene and 75 g (1414 mmol) acrylonitrile are mixed and stirred with 500 U/min. After addition of 2.2 g (4.1 mmol) of compound 410 the homogenous solution is cooled in an ice bath and degassed with argon for 30 min. The solution is then heated to 85° C. and polymerization is carried out during 6 h. After cooling down to room temperature the statistical polymer is precipitated in methanol and dried in a vacuum oven at 40° C. The polymer is obtained with 17.1% conversion as a white solid.

$Mn=8730$, $Mw=11930$, $PD=1.4$

Example B32

Reinitiation of Polymer B29 with Styrene at 85° C.

In a 100 ml Schlenck-flask with stopper and magnetic stirrer 1.25 g of statistical polymer B29 (Mn=21630) and 7.5 g (72 mmol) of styrene are placed and degassed. The clear solution is then stirred at 85° C. for 6 h. The residual monomer is removed under high vacuum at 70° C. 1.11 g (14.8%) of the monomer is converted and a colorless solid is obtained.

$Mn=31120$, $Mw=43680$, $PD=1.4$

Example B33

Reinitiation of Polymer B30 with n-BuA at 85° C.

In a 100 ml Schlenck-flask with stopper and magnetic stirrer 1.25 g of statistical polymer B30 (Mn=15730) and 7.5 g (58.5 mmol) of n-BuA are placed and degassed. The clear solution is then stirred at 85° C. for 6 h. The residual monomer is removed under high vacuum at 40° C. 6.88 g (91.8%) of the monomer is converted and a colorless solid is obtained.

$Mn=207700$, $Mw=441100$, $PD=2.1$

Example B34

Reinitiation of Polymer B31 with MMA at 85° C.

In a 100 ml Schlenck-flask with stopper and magnetic stirrer 0.51 g of statistical polymer B31 (Mn=8730) and 3.0 g (30 mmol) of MMA are placed and degassed. The clear solution is then stirred at 85° C. for 6 h. The residual monomer is removed under high vacuum at 40° C. 1.93 g (64.3%) of the monomer is converted and a colorless solid is obtained.

$Mn=67350$, $Mw=91580$, $PD=1.4$

The invention claimed is:

1. A compound of formula Ib or Ic

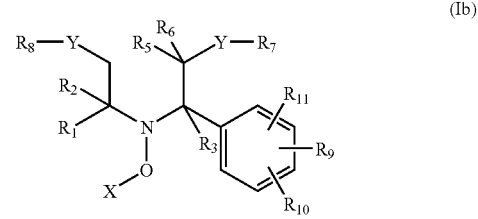

(Ib)

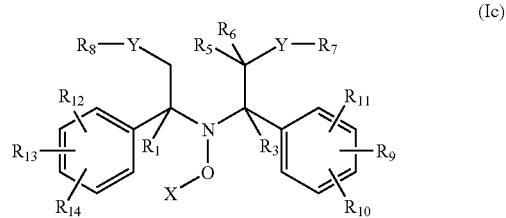

(Ic)

wherein

Y is O or $NR_{101}$ and $R_{101}$ is H or $C_1$-$C_{18}$alkyl or $R_7$ and/or $R_8$ and $R_{101}$ together with the nitrogen atom to which they are bound form a 5 or 6 membered heterocyclic ring;

$R_1$, $R_2$ and $R_3$ independently are benzyl, $C_1$-$C_{18}$alkyl, $C_2$-$C_{18}$alkenyl which are unsubstituted or substituted by OH or by a group —O—C(O)—$R_{102}$; or $C_2$-$C_{18}$alkyl which is interrupted by at least one O atom or a group $NR_{102}$ wherein $R_{102}$ is hydrogen, $C_1$-$C_{18}$alkyl or $C_6$-$C_{10}$aryl;

or $R_1$ and $R_2$ together with the carbon atom to which they are bound form a $C_5$-$C_{12}$cycloalkyl group; or in formula Ia $R_3$ and $R_4$ together with the carbon atom to which they are bound form a $C_5$-$C_{12}$cycloalkyl group;

$R_5$ and $R_6$ are independently H, $C_1$-$C_{18}$alkyl, $C_2$-$C_{18}$alkenyl, benzyl, $C_5$-$C_{12}$cycloalkyl or phenyl;

$R_7$ and $R_8$ independently are H, $C_1$-$C_{18}$alkyl, $C_2$-$C_{18}$alkenyl, $C_5$-$C_{12}$cycloalkyl or a group —C(O)—($C_1$-$C_{18}$)alkyl, —C(O)—O—($C_1$-$C_{18}$)alkyl, —C(O)—

O-phenyl, —C(O)—C(O)—OH, —C(O)—C(O)—NH—($C_1$-$C_{18}$alkyl), —C(S)—S—($C_1$-$C_{18}$)alkyl,

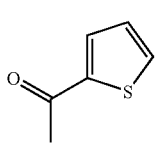

or —Si$R_a R_b R_c$ wherein $R_a$, $R_b$ and $R_c$ independently are $C_1$-$C_{18}$alkyl.

or $R_7$ and $R_8$ are a group

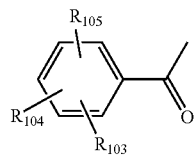

wherein $R_{103}$, $R_{104}$ and $R_{105}$ independently are H, $C_1$-$C_8$alkyl, $C_1$-$C_8$alkoxy, $C_1$-$C_8$alkylthio, —O—C(O)—($C_1$-$C_8$)alkyl, —O—C(O)—($C_6$-$C_{10}$)aryl, nitro, cyano or halogen;

$R_9$, $R_{10}$, $R_{11}$, $R_{12}$, $R_{13}$ and $R_{14}$ independently are H, OH, $C_1$-$C_8$alkoxy, $C_1$-$C_8$alkyl, SH, $C_1$-$C_8$alkylthio, —O—C(O)—($C_1$-$C_8$)alkyl, —O—C(O)—($C_6$-$C_{10}$)aryl, nitro, cyano, halogen or a group $NR_{106}R_{107}$ wherein $R_{106}$ and $R_{107}$ independently are hydrogen, $C_1$-$C_{18}$alkyl or $C_6$-$C_{10}$aryl or together with the nitrogen atom to which they are bound form a 5 or 6 membered heterocyclic ring;

and

X is selected from the group consisting of —$CH_2$-aryl,

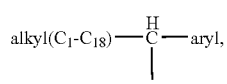

—$CH_2$—$CH_2$-aryl,

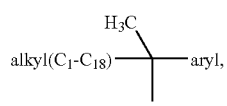

($C_5$-$C_6$cycloalkyl)$_2$CCN, ($C_1$-$C_{12}$alkyl)$_2$CCN, —$CH_2CH$=$CH_2$, ($C_1$-$C_{12}$) alkyl-$CR_{20}$—C(O)—($C_1$-$C_{12}$)alkyl, ($C_1$-$C_{12}$)alkyl-$CR_{20}$—C(O)—($C_6$-$C_{10}$)aryl, ($C_1$-$C_{12}$)alkyl-$CR_{20}$—C(O)—O—$R_{21}$, ($C_1$-$C_{12}$)alkyl-$CR_{20}$—C(O)-phenoxy, ($C_1$-$C_{12}$)alkyl-$CR_{20}$—C(O)—N-di($C_1$-$C_{12}$)alkyl, ($C_1$-$C_{12}$)alkyl-$CR_{20}$—CO—NH($C_1$-$C_{12}$)alkyl, ($C_1$-$C_{12}$)alkyl-$CR_{20}$—CO—$NH_2$, —$CH_2CH$=$CH$—$CH_3$, —$CH_2$—C($CH_3$)=$CH_2$, —$CH_2$—CH=CH-phenyl,

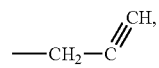

3-cyclohexenyl, 3-cyclopentenyl,

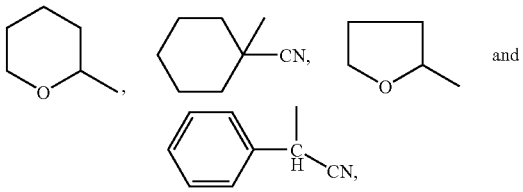

wherein $R_{20}$ is hydrogen or $C_1$-$C_{12}$alkyl;

$R_{21}$ is $C_1$-$C_{18}$alkyl or $C_2$-$C_{18}$alkyl which is interrupted by at least one O atom or a group $NR_{102}$ wherein $R_{102}$ is hydrogen, $C_1$-$C_{18}$alkyl or $C_6$-$C_{10}$aryl;

the alkyl groups are unsubstituted or substituted with one or more —OH, —COOH, —O($C_1$-$C_8$alkyl), $NR_{106}R_{107}$ or —$COR_{20}$ groups wherein $R_{20}$, $R_{106}$ and $R_{107}$ have the meanings as defined above; and the aryl groups are phenyl or naphthyl which are unsubstituted or substituted with $C_1$-$C_{12}$alkyl, halogen, $C_1$-$C_{12}$alkoxy, $C_1$-$C_{12}$alkylthio, $C_1$-$C_{12}$alkylcarbonyl, glycidyloxy, OH, SH, —COOH or —COO($C_1$-$C_{12}$)alkyl.

2. A compound according to claim 1 wherein X is selected from the group consisting of —$CH_2$-phenyl, $CH_3CH$-phenyl, ($CH_3$)$_2$C-phenyl, ($C_5$-$C_6$cycloalkyl)$_2$CCN, ($CH_3$)$_2$CCN,

—$CH_2CH$=$CH_2$, $CH_3CH$—CH=$CH_2$, ($C_1$-$C_8$alkyl)$CR_{20}$—C(O)-phenyl, ($C_1$-$C_8$)alkyl-$CR_{20}$—C(O)—($C_1$-$C_8$)alkoxy, ($C_1$-$C_8$)alkyl-$CR_{20}$—C(O)—($C_1$-$C_8$)alkyl, ($C_1$-$C_8$)alkyl-$CR_{20}$—C(O)—N-di($C_1$-$C_8$)alkyl, ($C_1$-$C_8$)alkyl-$CR_{20}$—C(O)—NH($C_1$-$C_8$)alkyl and ($C_1$-$C_8$)alkyl-$CR_{20}$—C(O)—$NH_2$, wherein $R_{20}$ is hydrogen or ($C_1$-$C_8$)alkyl.

3. A compound according to claim 2 wherein X is selected from the group consisting of —$CH_2$-phenyl, $CH_3CH$-phenyl, ($CH_3$)$_2$C-phenyl, ($C_5$-$C_6$cycloalkyl)$_2$CCN, ($CH_3$)$_2$CCN,

—$CH_2CH$=$CH_2$, $CH_3CH$—CH=$CH_2$, ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl and ($C_1$-$C_4$)alkyl-$CR_{20}$—C(O)—$NH_2$, wherein $R_{20}$ is hydrogen or ($C_1$-$C_4$)alkyl.

4. A compound according to claim 1 wherein Y is O.

5. A compound according to claim 1 wherein $R_1$, $R_2$ and $R_3$ are $C_1$-$C_5$alkyl;

$R_4$ is $C_2$-$C_6$alkyl;

$R_5$ and $R_6$ are H;

$R_7$ and $R_8$ independently are H, $C_1$-$C_{18}$alkyl, allyl, benzyl, $C_5$-$C_{12}$cycloalkyl or a group —C(O)—($C_1$-$C_{18}$)alkyl, —C(O)—O—($C_1$-$C_{18}$)alkyl, —C(O)—C(O)—OH, —C(S)—S—($C_1$-$C_{18}$)alkyl,

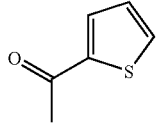

or —Si$R_a R_b R_c$ wherein $R_a$, $R_b$ and $R_c$ independently are $C_1$-$C_{18}$alkyl, or $R_7$ and $R_8$ are a group

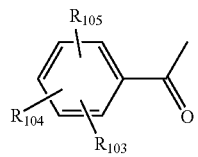

wherein $R_{103}$, $R_{104}$ and $R_{105}$ independently are H, $C_1$-$C_8$alkoxy, $C_1$-$C_8$alkylthio, —O—C(O)—($C_1$-$C_8$)alkyl, nitro, cyano, halogen or $C_1$-$C_8$alkyl;

$R_9$, $R_{10}$ and $R_{11}$ independently are H, $C_1$-$C_8$alkoxy, $C_1$-$C_8$alkylthio, —O—C(O)—($C_1$-$C_8$)alkyl, nitro, cyano, halogen or $C_1$-$C_8$alkyl; and X is as defined in claim 1.

6. A compound of formula Ib according to claim 1 wherein

Y is O;

$R_1$ and $R_2$ are $C_1$-$C_5$alkyl, or together with the carbon atom to which they are bound form a $C_5$-$C_7$cycloalkyl group;

$R_3$ is methyl, ethyl or propyl;

$R_5$ and $R_6$ are H;

$R_7$ and $R_8$ independently are H, $C_1$-$C_{18}$alkyl, allyl, benzyl, $C_5$-$C_{12}$cycloalkyl or a group —C(O)—($C_1$-$C_{18}$)alkyl, —C(O)—O—($C_1$-$C_{18}$)alkyl, —C(O)—C(O)—OH, —C(S)—S—($C_1$-$C_{18}$)alkyl,

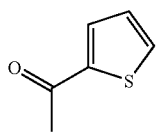

or —Si$R_a R_b R_c$ wherein $R_a$, $R_b$ and $R_c$ independently are $C_1$-$C_{18}$alkyl, or $R_7$ and $R_8$ are a $R_{10}$

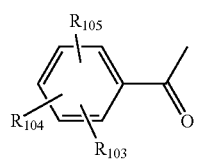

wherein $R_{103}$, $R_{104}$ and $R_{105}$ independently are H, $C_1$-$C_8$alkoxy, $C_1$-$C_8$alkylthio, —O—C(O)—($C_1$-$C_8$)alkyl, nitro, cyano, halogen or $C_1$-$C_8$alkyl;

$R_9$, $R_{10}$ and $R_{11}$ independently are H, $C_1$-$C_8$alkoxy, $C_1$-$C_8$alkylthio, —O—C(O)—($C_1$-$C_8$)alkyl, nitro, cyano, halogen or $C_1$-$C_8$alkyl; and X is selected from the group consisting of —$CH_2$-aryl,

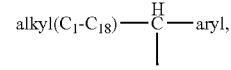

—$CH_2$—$CH_2$-aryl,

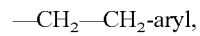

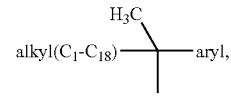

($C_5$-$C_6$cycloalkyl)$_2$CCN, ($C_1$-$C_{12}$alkyl)$_2$CCN, —$CH_2CH$=$CH_2$, ($C_1$-$C_{12}$) alkyl-$CR_{20}$—C(O)—($C_1$-$C_{12}$) alkyl, ($C_1$-$C_{12}$)alkyl-$CR_{20}$—C(O)—($C_6$-$C_{10}$)aryl, ($C_1$-$C_{12}$) alkyl-$CR_{20}$—C(O)—O—$R_{21}$, ($C_1$-$C_{12}$)alkyl-$CR_{20}$—C(O)-phenoxy, ($C_1$-$C_{12}$)alkyl-$CR_{20}$—C(O)—N-di($C_1$-$C_{12}$)alkyl, ($C_1$-$C_{12}$)alkyl-$CR_{20}$—CO—NH($C_1$-$C_{12}$)alkyl, ($C_1$-$C_{12}$) alkyl-$CR_{20}$—CO—$NH_2$, —$CH_2CH$=CH—$CH_3$, —$CH_2$—C($CH_3$)=$CH_2$, —$CH_2$—CH=CH-phenyl,

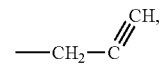

3-cyclohexenyl, 3-cyclopentenyl,

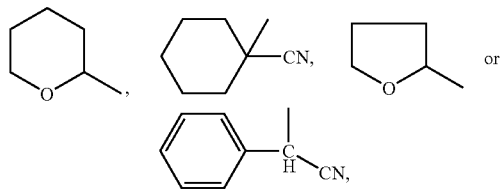

wherein $R_{20}$ is hydrogen or $C_1$-$C_{12}$alkyl;

$R_{21}$ is $C_1$-$C_{18}$alkyl or $C_2$-$C_{18}$alkyl which is interrupted by at least one O atom or a group $NR_{102}$ wherein $R_{102}$ is hydrogen, $C_1$-$C_{18}$alkyl or $C_6$-$C_{10}$aryl;

the alkyl groups are unsubstituted or substituted with one or more —OH, —COOH, —O($C_1$-$C_8$alkyl), $NR_{106}R_{107}$ or —$COR_{20}$ groups wherein $R_{20}$, $R_{106}$ and $R_{107}$ have the meanings as defined above; and the aryl groups are phenyl or naphthyl which are unsubstituted or substituted with $C_1$-$C_{12}$alkyl, halogen, $C_1$-$C_{12}$alkoxy, $C_1$-$C_{12}$alkylcarbonyl, glycidyloxy, OH, —COOH or —COO($C_1$-$C_{12}$)alkyl.

7. A polymerizable composition, comprising a) at least one ethylenically unsaturated monomer or oligomer, and b) a compound according to formula (Ib) or (Ic) according to claim 1.

8. A process for preparing an oligomer, a cooligomer, a polymer or a copolymer (block or random) by free radical polymerization of at least one ethylenically unsaturated monomer or oligomer, which comprises (co)polymerizing the monomer or monomers/oligomers in the presence of an initiator compound of formula (Ib) or (Ic) according to claim 1 under reaction conditions capable of effecting scission of the O—X bond to form two free radicals, the radical •X being capable of initiating polymerization.

9. A process according to claim 8 wherein the scission of the O—X bond is effected by ultrasonic treatment, heating or exposure to electromagnetic radiation ranging from γ to microwaves.

10. A process according to claim 9 wherein the scission of the O—X bond is effected by heating and takes place at a temperature of between 50° C. and 160° C.

11. A process according to claim 8 wherein the compound is present in an amount from 0.001 mol-% to 20 mol-%, based on the monomer or monomer mixture.

12. A polymerizable composition, comprising
a) at least one ethylenically unsaturated monomer or oligomer, and
b) a compound according to formula (IIb) or (IIc)

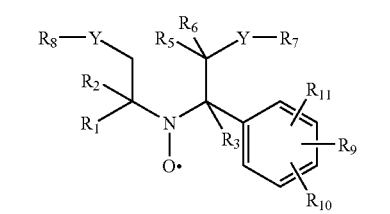

(IIb)

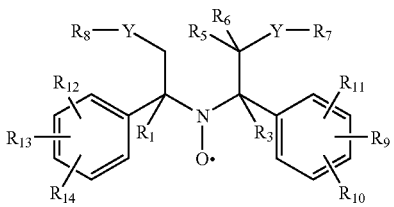

(IIc)

wherein
Y is O or $NR_{101}$ and $R_{10}$ is H or $C_1$-$C_{18}$alkyl or $R_7$ and/or $R_8$ and $R_{101}$, together with the nitrogen atom to which they are bound form a 5 or 6 membered heterocyclic ring;

$R_1$, $R_2$ and $R_3$ independently are benzyl, $C_1$-$C_{18}$alkyl, $C_2$-$C_{18}$alkenyl which are unsubstituted or substituted by OH or a by group —O—C(O)—$R_{102}$; or $C_2$-$C_{18}$alkyl which is interrupted by at least one O atom or a group $NR_{102}$ wherein $R_{102}$ is hydrogen, $C_1$-$C_{18}$alkyl or $C_6$-$C_{10}$aryl;

or $R_1$ and $R_2$ together with the carbon atom to which they are bound form a $C_5$-$C_{12}$cycloalkyl group; or in formula Ia $R_3$ and $R_4$ together with the carbon atom to which they are bound form a $C_5$-$C_{12}$cycloalkyl group;

$R_5$ and $R_6$ are independently H, $C_1$-$C_{18}$alkyl, $C_2$-$C_{18}$alkenyl, benzyl, $C_5$-$C_{12}$cycloalkyl or phenyl;

$R_7$ and $R_8$ independently are H, $C_1$-$C_{18}$alkyl, $C_2$-$C_{18}$alkenyl, $C_5$-$C_{12}$cycloalkyl or a group —C(O)—($C_1$-$C_{18}$)alkyl, —C(O)—O—($C_1$-$C_{18}$)alkyl, —C(O)—O-phenyl, —C(O)—C(O)—OH, —C(O)—C(O)—NH—($C_1$-$C_{18}$alkyl), —C(S)—S—($C_1$-$C_{18}$)alkyl,

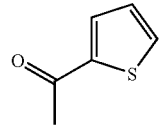

or —$SiR_aR_bR_c$ wherein $R_a$, $R_b$ and $R_c$ independently are $C_1$-$C_{18}$alkyl, or $R_7$ and $R_8$ are group

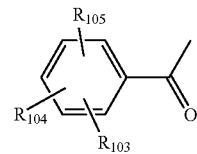

wherein $R_{103}$, $R_{104}$ and $R_{105}$ independently are H, $C_1$-$C_8$alkyl, $C_1$-$C_8$alkoxy, $C_1$-$C_8$alkylthio, —O—C(O)—($C_1$-$C_8$)alkyl, —O—C(O)—($C_6$-$C_{10}$)aryl, nitro, cyano or halogen; and $R_9$, $R_{10}$, $R_{11}$, $R_{12}$, $R_{13}$ and $R_{14}$ independently are H, OH, $C_1$-$C_8$alkoxy, $C_1$-$C_8$alkyl, SH, $C_1$-$C_8$alkylthio, —O—C(O)—($C_1$-$C_8$)alkyl, —O—C(O)—($C_6$-$C_{10}$)aryl, nitro, cyano, halogen or a group $NR_{106}R_{107}$ wherein $R_{106}$ and $R_{107}$ independently are hydrogen, $C_1$-$C_{18}$alkyl or $C_6$-$C_{10}$aryl or together with the nitrogen atom to which they are bound form a 5 or 6 membered heterocyclic ring; and c) a source of free radicals capable of initiating polymerization of ethylenically unsaturated monomers.

13. A process for preparing an oligomer, a cooligomer, a polymer or a copolymer (block or random) by free radical polymerization of at least one ethylenically unsaturated monomer/oligomer, which comprises subjecting the composition according to claim 12 to heat or actinic radiation.

14. A compound of formula IIb

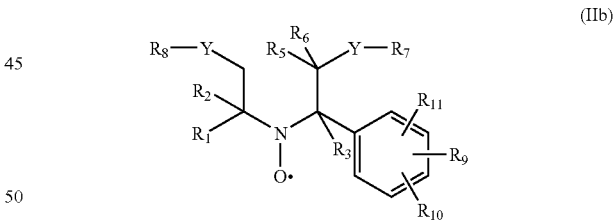

(IIb)

wherein
Y is O or $NR_{101}$ and $R_{10}$ is H or $C_1$-$C_{18}$alkyl or $R_7$ and $R_{101}$ together with the nitrogen atom to which they are bound form a 5 or 6 membered heterocyclic ring;

$R_1$, $R_2$ and $R_3$ independently are benzyl, $C_1$-$C_{18}$alkyl, $C_2$-$C_{18}$alkenyl which are unsubstituted or substituted by OH or a group —O—C(O)—$R_{102}$; or $C_2$-$C_{18}$alkyl which is interrupted by at least one O atom or a group $NR_{102}$ wherein $R_{102}$ is hydrogen, $C_2$-$C_{18}$alkyl or $C_6$-$C_{10}$aryl;

or $R_1$ and $R_2$ together with the carbon atom to which they are bound form a $C_5$-$C_{12}$cycloalkyl group;

$R_5$ and $R_6$ are independently H, $C_1$-$C_{18}$alkyl, $C_2$-$C_{18}$alkenyl, benzyl, $C_5$-$C_{12}$cycloalkyl or phenyl;

$R_7$ and $R_8$ independently are H, $C_1$-$C_{18}$alkyl, $C_2$-$C_{18}$alkenyl, $C_5$-$C_{12}$cycloalkyl or a group —C(O)—($C_1$-$C_{18}$)alkyl, —C(O)—O—($C_1$-$C_{18}$)alkyl, —C(O)—O-phenyl, —C(O)—C(O)—OH, —C(O)—C(O)—NH—($C_1$-$C_{18}$alkyl), —C(S)—S—($C_1$-$C_{18}$)alkyl,

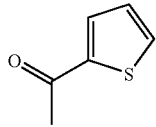

or —SiR$_a$R$_b$R$_c$ wherein R$_a$, R$_b$ and R$_c$ independently are $C_1$-$C_{18}$alkyl, or $R_7$ and $R_8$ are a group

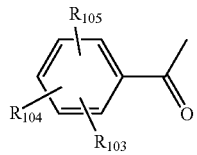

wherein $R_{103}$, $R_{104}$ and $R_{105}$ independently are H, $C_1$-$C_8$alkyl, $C_1$-$C_8$alkoxy, $C_1$-$C_8$alkylthio, —O—C(O)—($C_1$-$C_8$)alkyl, —O—C(O)—($C_6$-$C_{10}$)aryl, nitro, cyano or halogen; and $R_9$, $R_{10}$ and $R_{11}$, independently are H, OH, $C_1$-$C_8$alkoxy, $C_0$-$C_8$alkyl, SH, $C_1$-$C_8$alkylthio, —O—C(O)—($C_1$-$C_8$)alkyl, —O—C(O)—($C_6$-$C_{10}$)aryl, nitro, cyano, halogen or a group NR$_{106}$R$_{107}$ wherein $R_{106}$ and $R_{107}$ independently are hydrogen, $C_1$-$C_{18}$alkyl or $C_6$-$C_{10}$aryl or together with the nitrogen atom to which they are bound form a 5 or 6 membered heterocyclic ring.

15. A compound of formula IIb according to claim 14 wherein Y is O;

$R_1$ and $R_2$ are —CH$_3$, or together with the carbon atom to which they are bound form a $C_5$-$C_7$cycloalkyl group;

$R_3$ is methyl, ethyl or propyl;

$R_5$ and $R_6$ are H;

$R_7$ and $R_8$ independently are H, $C_1$-$C_{18}$alkyl, allyl, benzyl, $C_5$-$C_{12}$cycloalkyl or a group —C(O)—($C_1$-$C_{18}$)alkyl, —C(O)—O—($C_1$-$C_{18}$)alkyl, —C(O)—C(O)—OH, —C(S)—S—($C_1$-$C_{18}$)alkyl or —SiR$_a$R$_b$R$_c$ wherein R$_a$R$_b$ and R$_c$ independently are $C_1$-$C_{18}$alkyl, or $R_7$ and $R_8$ are group

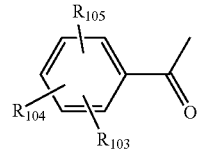

wherein $R_{103}$, $R_{104}$ and $R_{105}$ independently are H, $C_1$-$C_8$alkoxy, $C_1$-$C_8$alkylthio, —O—C(O)—($C_1$-$C_8$)alkyl, nitro, cyano, halogen or $C_1$-$C_8$alkyl; and $R_9$, $R_{10}$ and $R_{11}$ independently are H, $C_1$-$C_8$alkoxy, $C_1$-$C_8$alkylthio, —O—C(O)—($C_1$-$C_8$)alkyl, nitro, cyano, halogen or $C_1$-$C_8$alkyl.

* * * * *